United States Patent
Cho

(10) Patent No.: US 8,023,009 B2
(45) Date of Patent: Sep. 20, 2011

(54) IMAGING APPARATUS FOR CORRECTING OPTICAL DISTORTION AND WIDE-ANGLE DISTORTION

(75) Inventor: Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 785 days.

(21) Appl. No.: 12/056,884

(22) Filed: Mar. 27, 2008

(65) Prior Publication Data

US 2008/0239107 A1 Oct. 2, 2008

(30) Foreign Application Priority Data

Mar. 27, 2007 (JP) .................................. 2007-082089

(51) Int. Cl.
*H04N 5/217* (2011.01)
*H04N 5/228* (2006.01)
(52) U.S. Cl. ....................... 348/241; 348/222.1; 382/275
(58) Field of Classification Search ................. 348/222.1
See application file for complete search history.

(56) References Cited

U.S. PATENT DOCUMENTS

| | | | | |
|---|---|---|---|---|
| 5,905,530 A * | 5/1999 | Yokota et al. | ............. | 348/240.99 |
| 6,995,790 B2 * | 2/2006 | Higurashi et al. | ......... | 348/218.1 |
| 7,260,271 B2 * | 8/2007 | Funamoto | ..................... | 382/275 |
| 7,391,446 B2 * | 6/2008 | Yoshida | .................... | 348/240.99 |
| 7,839,446 B2 * | 11/2010 | Hirano et al. | ............. | 348/333.09 |
| 2004/0207743 A1 | 10/2004 | Nozaki et al. | | |
| 2008/0129846 A1 * | 6/2008 | Azuma | .......................... | 348/241 |
| 2009/0046179 A1 * | 2/2009 | Aoyama et al. | ............... | 348/241 |
| 2009/0207266 A1 * | 8/2009 | Yoda | ......................... | 348/222.1 |

FOREIGN PATENT DOCUMENTS

| | | |
|---|---|---|
| JP | 918763 A | 1/1997 |
| JP | 1165033 A | 3/1999 |
| JP | 11252431 A | 9/1999 |
| JP | 2002-207242 A | 7/2002 |
| JP | 2003-219357 A | 7/2003 |

OTHER PUBLICATIONS

CN Notification of the Second Office Action, dated May 11, 2010, issued in corresponding CN Application No. 200810127722.8, 11 pages English and Chinese.
Notification of Reasons for Refusal, dated Jan. 5, 2011, issued in corresponding JP Application No. 2007-082089, 4 pages in English and Japanese.

* cited by examiner

*Primary Examiner* — Ngoc-Yen Vu
(74) *Attorney, Agent, or Firm* — Sughrue Mion, PLLC

(57) ABSTRACT

A digital camera includes a distortion correction section, which is composed of a focal length determining section, a distortion evaluation section and a correction amount calculating section. The focal length determining section evaluates a focal length at the time of image capture. Based on the focal length, the distortion evaluation section evaluates the magnitude of wide-angle distortion and optical distortion in a captured image. Based on this evaluation, the distortion correction section selects an appropriate coefficient from an optical distortion correction coefficient table or a wide-angle distortion correction coefficient table. Using the selected coefficient, the correction amount calculating section applies a coordinate transform processing to cause positive or negative distortion to the captured image, and corrects the wide-angle distortion or the optical distortion.

13 Claims, 20 Drawing Sheets

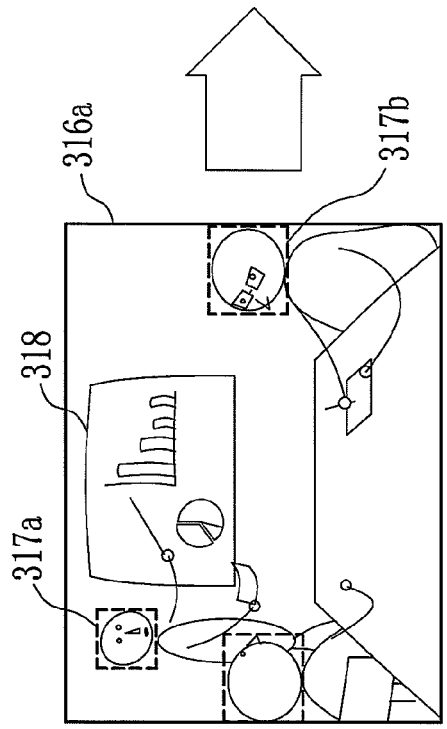
FIG. 14A
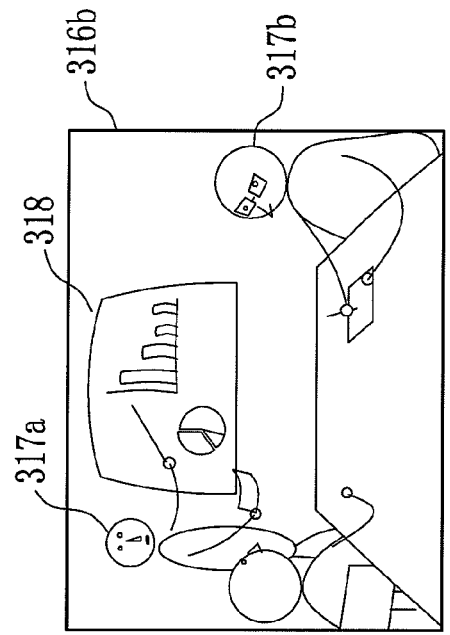
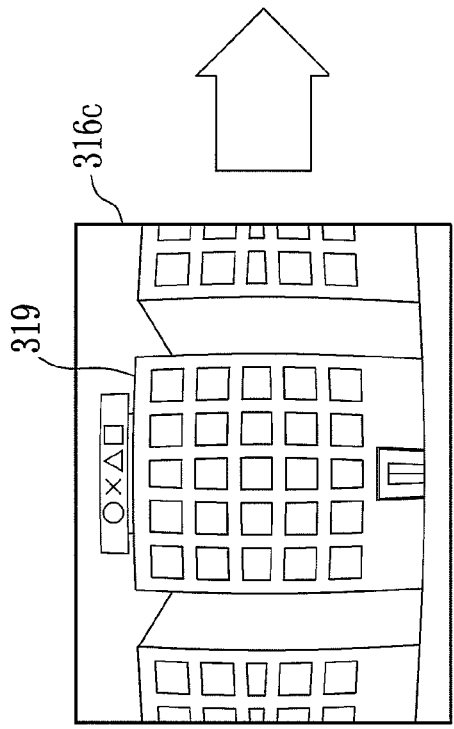
FIG. 14B
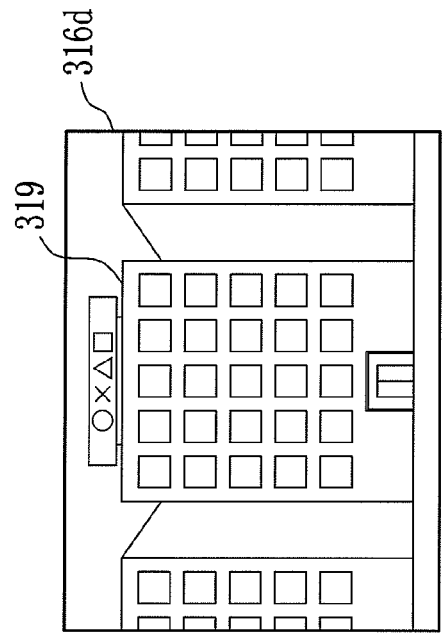

IMAGING APPARATUS FOR CORRECTING OPTICAL DISTORTION AND WIDE-ANGLE DISTORTION

FIELD OF THE INVENTION

The present invention relates to an imaging apparatus capable of correcting distortion, especially wide-angle distortion of a subject image.

BACKGROUND OF THE INVENTION

Digital cameras that have been popular in recent years obtain an image in the form of digital data. Unlike the photographic images, the digital image data can be subjected to various image processing that allows so-called retouching to modify the image and correct color in a later time. It is also a common technique during image capture to detect human faces in a picture frame and control to have a proper face size and appropriate brightness (see, for example, Japanese Patent Laid-open Publication No. 2004-320284 corresponding to U.S. Patent Application Publication No. 2004/0207743).

Meanwhile, when a subject image is formed on a photographic film or an image sensor through a lens, the image is sometimes blurred or distorted. A main cause of such blur and distortion is aberration of the lens used. In particular, the blur is caused by spherical aberration, astigmatism, coma and curvature of field.

The distortion of image, on the other hand, is caused by distortion aberration. Since the distortion aberration is a phenomenon in which the incident light is more refracted with distance from a lens center, the resultant distortion (hereinafter, optical distortion) of image changes according to positional relationship between a lens and an aperture stop. Therefore, in a zoom lens whose aperture stop changes the relative position to the lens system, it is difficult to reduce the optical distortion uniformly.

For film cameras, there would be no choice in reducing the optical distortion but to arrange the layout of a photographic film or the design of a taking lens. For digital cameras, however, the optical distortion can be reduced by applying an electrical image conversion processing to image data. For example, there are known a video camera to display different portions of an image with different magnifications (see, for example, Japanese Laid-open Publication No. 09-018763), and a digital camera to reduce the optical distortion of a captured image by using an image conversion processing (see, for example, Japanese Patent Laid-open Publication No. 11-252431).

Apart from the optical distortion, there is also known wide-angle distortion. The wide-angle distortion is a phenomenon that arises when a three-dimensional subject is projected through a lens onto a flat plane (a light receiving surface of an image sensor or a photographic film), and has an effect to elongate the image radially from the center of the picture frame. Therefore, the wide-angle distortion usually becomes apparent in wide-angle images, and is more prominent in the periphery of picture frame.

Since it results from a basic principle of the imaging apparatus, the wide-angle distortion cannot be eliminated completely. However, it is known that the wide-angle distortion becomes less noticeable when a lens with large distortion aberration is used (see, for example, Japanese Patent Laid-open Publication No. 11-065033).

Conventionally, a popular lens has a 45 degree angle of view, and the wide-angle distortion has not been a problem. In recent years, however, the wide-angle lenses with a 70 degree or more angle of view become popular, and loss of image quality due to the wide-angle distortion grows into a serious problem. For example, if a group image is captured with this type of wide-angle lens, the person at the periphery of the picture frame may be saddled with a distorted face due to the wide-angle distortion.

Nonetheless, if a lens with large distortion aberration is employed to minimize the wide-angle distortion, the optical distortion will be promoted excessively in a captured image. For example, capturing a building or such a rectilinear object with this type of lens will only produce unnatural images where the straight lines are curved. This is not a problem to special effect cameras, such as the lens-fitted film unit of the Publication No. 11-065033, but a serious problem to normal digital cameras.

SUMMARY OF THE INVENTION

In view of the foregoing, an object of the present invention is to provide an imaging apparatus capable of correcting distortion of image depending on the type of a subject in a picture frame.

In order to achieve the above and other objects, an imaging apparatus according to the present invention includes a taking lens, an image sensor, and a distortion corrector for correcting optical distortion and wide-angle distortion of an image captured with the taking lens. When correcting the optical distortion due to distortion aberration of the taking lens, the distortion corrector applies image conversion processing to the image so as to give the image with distortion of opposite sign to the optical distortion. When correcting wide-angle distortion, the distortion corrector applies image conversion processing to the image so as to give the image with negative distortion corresponding to the magnitude of the wide-angle distortion.

It is preferred to provide a correction selector for selecting which to correct the optical distortion and the wide-angle distortion. Preferably, when the optical distortion due to the distortion aberration of the taking lens is negative and has the magnitude to correct the wide-angle distortion, the correction selector does not select correcting the optical distortion and the wide-angle distortion but corrects the wide-angle distortion using the optical distortion due to the distortion aberration of the taking lens.

It is also preferred to provide a face detector to detect human faces in the image. In this case, the correction selector preferably selects correcting the wide-angle distortion when a human face is detected in the image. It is more preferred that the correction selector selects correcting the wide-angle distortion when a human face is detected outside a predetermined angle of incidence.

It is further preferred to produce both an optical distortion corrected image which is corrected for optical distortion, and a wide-angle distortion corrected image which is corrected for wide-angle distortion when the correction selector selects correcting both the wide-angle distortion and the optical distortion.

Preferably in this case, the wide-angle distortion corrected image is produced by applying the image conversion processing to give negative distortion to the optical distortion corrected image.

It is preferred to provide a memory device for storing the optical distortion corrected image and the wide-angle distortion corrected image, and more preferred to provide a display device that firstly retrieves the optical distortion corrected image and the wide-angle distortion corrected image from the memory device, and halves each of these images, and then juxtaposes corresponding halves of the images, and an image selector that selects one of the optical distortion corrected image and said wide-angle distortion corrected image, and then deletes unselected one of the images form the memory device.

More preferably, the image conversion processing is coordinate transform processing using coordinate transform function, and the imaging apparatus includes a correction coefficient table containing the coefficients of the coordinate transform function.

According to the present invention, the imaging apparatus is provided with the distortion corrector that performs the image conversion processing to correct the optical and the wide-angle distortion. Therefore, an image with little distortion can easily be produced. Further, the magnification of the optical distortion and presence/absence of human faces are detected before the wide-angle distortion correction, and it is possible to produce an image properly corrected depending on the condition of the image and the type of the subject.

BRIEF DESCRIPTION OF THE DRAWINGS

The above objects and advantages of the present invention will become more apparent from the following detailed description when read in connection with the accompanying drawings, in which:

FIG. 14A and FIG. 14B are explanatory views illustrating image distortion correction based on a result of face detection;

DETAILED DESCRIPTION OF THE PREFERRED EMBODIMENTS

First Embodiment

Figure 1:
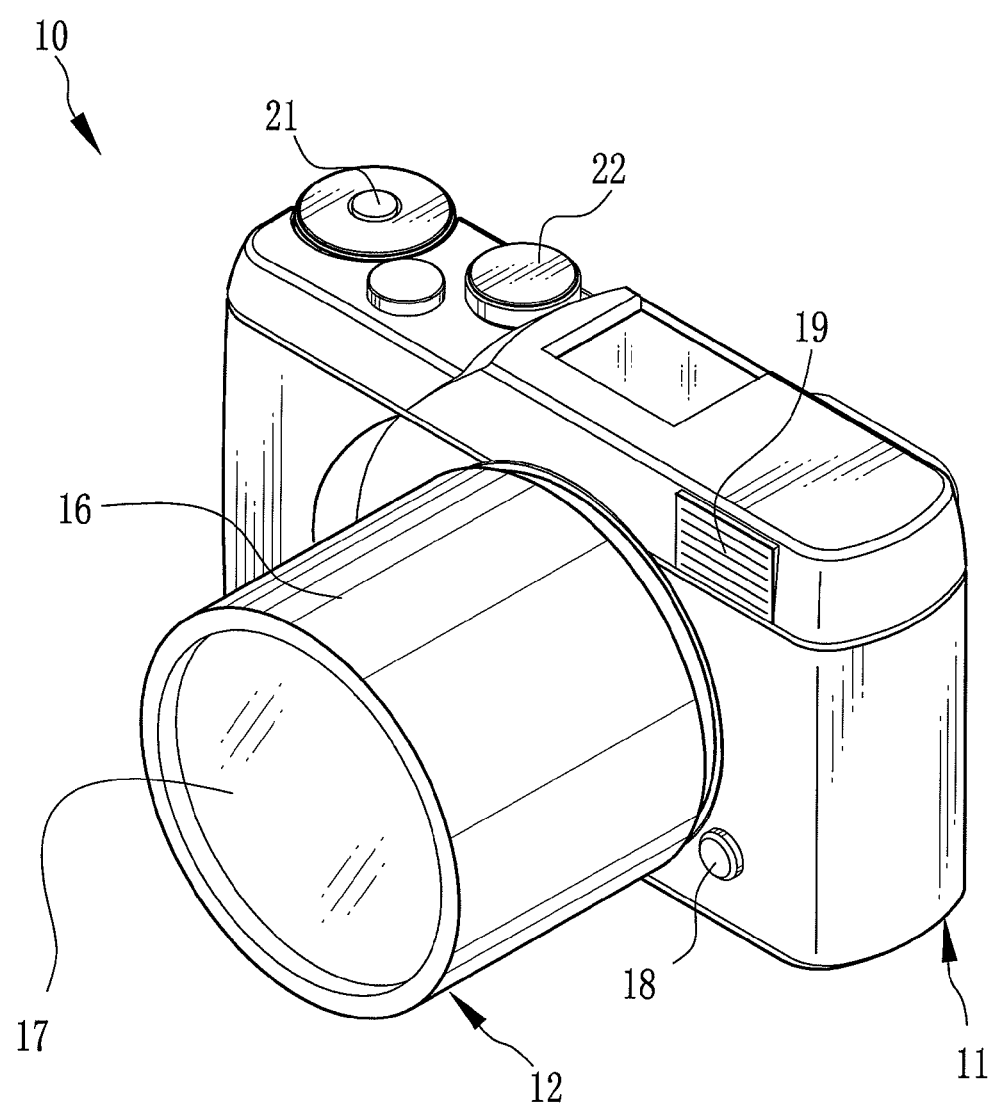
FIG. 1 is a perspective view of a digital camera according to the present invention.

Referring to FIG. 1, a digital camera (imaging apparatus) 10 is composed of a camera body 11 and a detachable lens unit 12.

The lens unit 12 includes a lens barrel 16 and a taking lens 17 disposed in this lens barrel 16. The lens unit 12 and the camera body 11 have, on their mount portions, bayonet claws (not shown) to interlock with each other. When the lens unit 12 is mounted and rotated on the camera body 11, the bayonet claws interlock with each other, and the lens unit 12 is securely attached to the camera body 11. The lens unit 12 is detachable from the camera body 11 and changed with another lens unit having a different type of taking lens, if necessary.

On a front surface of the camera body 11 are provided an unlock button 18 and a flash emitter 19. To prevent accidental drop off of the lens barrel 16 from the camera body 11, the lens unit 12 is locked once the lens unit 12 is attached to the camera body 11. The unlock button 18 is pressed to unlock the lens unit 12. As is well known, the flash emitter 19 is activated when, for example, a main subject is dark.

On a top surface of the camera body 11 are provided a shutter release button 21, a mode selector dial 22 and such. The shutter release button 21 is pressed in two steps. Halfway pressing of the shutter release button 21 activates preliminary operations such as the auto-focus adjustment (AF) and the auto-exposure adjustment (AE), while complete pressing of the shutter release button 21 captures an image of a subject. The mode selector dial 22 switches the operation modes of the digital camera 10. The digital camera 10 works in different operation modes, such as a reproduction mode, multiple image capture modes, and a set-up mode.

The reproduction mode is for reproducing the image in a recording medium, such as a memory card 23 (see, FIG. 3), and displaying the reproduced image on a display panel 24 (described later). The image capture modes are for capturing and storing a subject image in the memory card 23. The digital camera 10 offers a distant view mode, a close view mode, a portrait mode, an auto mode, a manual mode, a wide-angle distortion correction mode and a group shot mode, and one of these modes is selected with a mode selector dial. In the auto mode, for example, an optimal photographic condition is established automatically. In the wide-angle distortion correction mode, the wide-angle distortion is automatically corrected on the captured image. In the group shot mode, an optimal photographic condition for group shot is established automatically. The digital camera 10 carries different photographic conditions for each image capture mode, and automatically establishes the photographic condition depending on the selected image capture mode.

The set-up mode allows fine adjustments on camera settings, such as brightness of the display panel 24 and shutter sound. In the set-up mode, the settings of the reproduction mode and the photographic condition of each image capture mode can be changed finely and individually.

The setup parameters of the reproduction mode may be, for example, a display method of the display panel 24. The setup parameters of the image capture modes may be, for example, necessity (on/off) of image distortion correction and a method of the image distortion correction.

Figure 2:
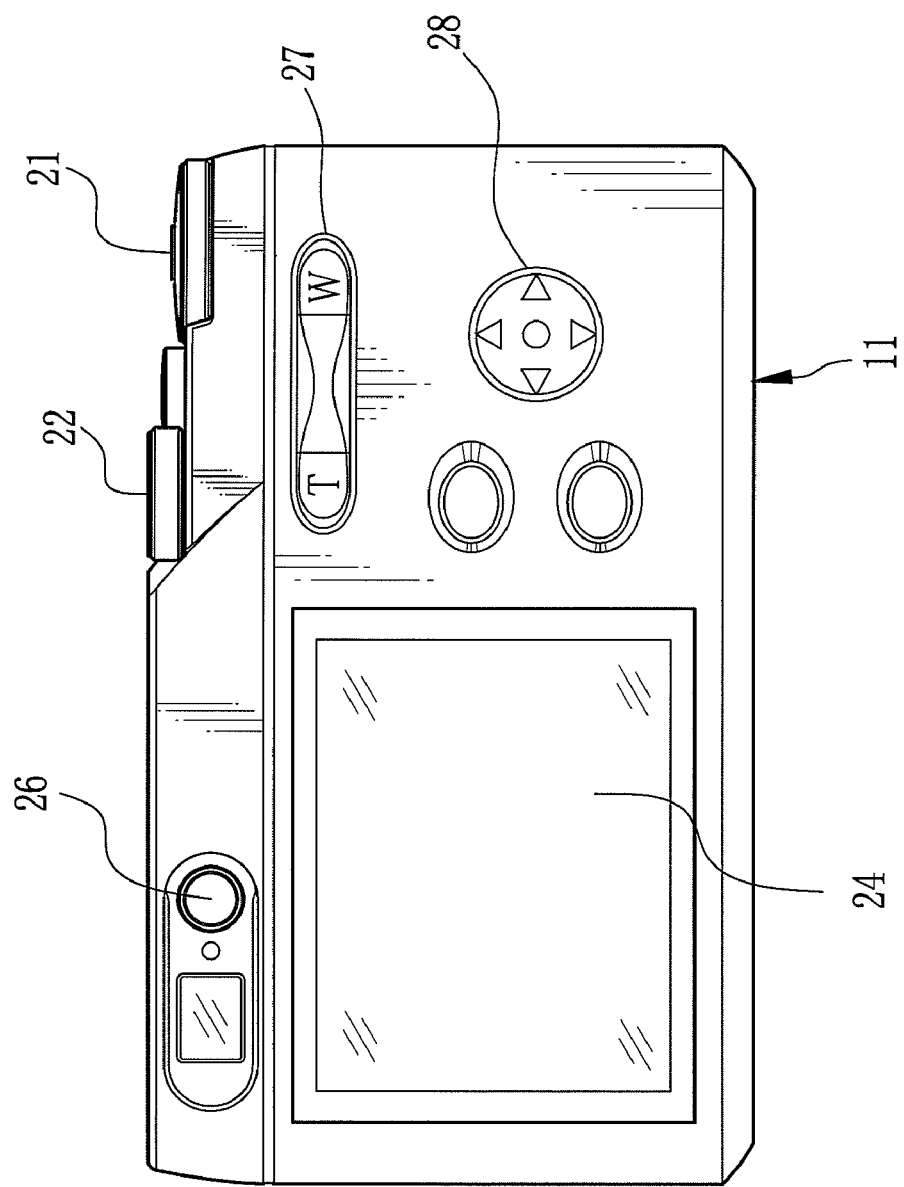
FIG. 2 is a rear elevation view of the digital camera.

As shown in FIG. 2, a rear surface of the digital camera 10 is provided with a power button 26, a zoom key 27, a cross key 28 and the display panel 24. The power button 26, when pressed for a while, turns on and off the digital camera 10. The zoom key 27 is pressed down to continuously change image magnification by changing a focal length of the taking lens 17. The four-directional cross key 28 is pressed to select a menu, an image or the like on the display panel 24. The display panel 24 is a liquid crystal display panel. In the image capturing modes, the display panel 24 functions as an electric view finder to display a through image in real time.

On a lateral side of the camera body 11, there are a card slot, a communication port and a power connector (all not shown). The card slot is where the memory card 23 or such a recording medium is inserted and removed. The communication port is coupled to external devices such as a computer and a printer, allowing to send and receive a captured image and necessary information. The power connector is coupled to an external power source to charge an internal battery of the digital camera 10.

Figure 3:
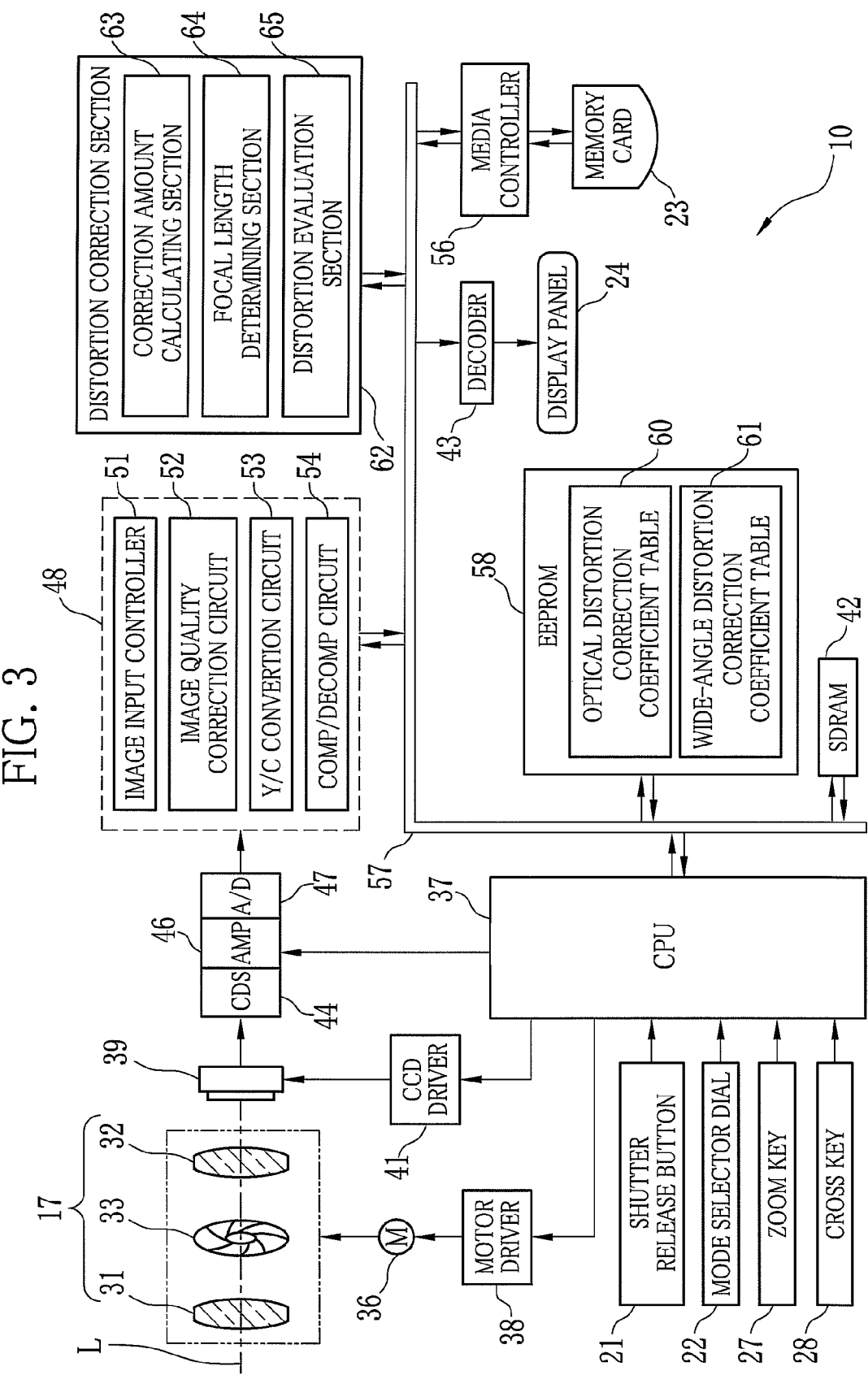
FIG. 3 is a block diagram illustrating an electrical configuration of the digital camera according to a first embodiment.

As shown in FIG. 3, the taking lens 17 is composed of, for example, a zooming lens 31, a focusing lens 32 and an aperture stop 33. The zooming lens 31 and the focusing lens 32 are movable between a wide-angle side and a telephoto side along an optical axis L of the taking lens 17. The zooming lens 31 is moved according to pressing of the zoom key 27, and changes image magnification. The focusing lens 32 moves in conjunction with the zooming lens 31 or is moved in response to halfway pressing of the shutter release button 21, so as to bring a subject into focus. The aperture stop 33 changes the size of an aperture and changes the amount of light for image capture. In particular, when the shutter release button 21 is pressed halfway, the aperture stop 33 changes the size of the aperture depending on the exposure amount.

The zooming lens 31, the focusing lens 32 and the aperture stop 33 are driven by a lens motor 36. This lens motor 36 includes several motors that drive each of the zooming lens 31, the focusing lens 32 and the aperture stop 33 separately. The lens motor 36 is controlled by a motor driver 38 that receives a control signal from a CPU 37.

A CCD 39 is disposed behind the taking lens 17. The CCD 39 photo-electrically converts a subject image focused through the taking lens 17 onto the light receiving surface, and outputs an analog image signal. Operation of the CCD 39 is controlled by a CCD driver 41 that receives a control signal from the CPU 37.

The CCD 39 generates two types of image signals, an image signal for recording (hereinafter, principal image signal) with a large number of pixels which is generated when the shutter release button 21 is pressed completely to record an image, and a through image signal used to display a through image on the display panel 24 at the time of framing. The principal image signal is firstly converted into principal image data of digital form, and subjected to various image processing, and then stored in the memory card 23. Meanwhile, the through image signal is firstly converted into through image data of digital form, and subjected to various simple imaging processing, and then stored in an SDRAM 42 temporarily. This through image data is retrieved from the SDRAM 42, and converted by a decoder 43 into a composite signal of analog form, and then displayed on the display panel 24. The CCD 39 generates the through image signal at a frame rate of, for example, 30 frames per second.

The image signal, out of the CCD 39, is input to a correlation double sampling circuit (CDS) 44 that removes noises from it, and then amplified by a signal amplifier circuit (AMP) 46. The amplified image signal is converted by an A/D converter (A/D) 47 into image data. This image data is RGB image data corresponding to the amount of charge in each cell of the CCD 39.

A DSP 48 includes an image input controller 51, an image quality correction circuit 52, a Y/C conversion circuit 53 and a compression/decompression circuit 54. The image input controller 51 temporarily stores (buffers) the image data coming from the A/D 47, and writes the data to the SDRAM 42 connected through a data bus 57.

The image quality correction circuit 52 retrieves the image data from the SDRAM 42, and applies such image quality correction process as a gradation processing, a white balance correction processing and a gamma correction processing to the image data, and then stores this corrected image data to the SDRAM 42 again.

The Y/C conversion circuit 53 retrieves from the SDRAM 42 the image data after the image quality correction of the image quality correction circuit 52, and converts the data into a luminance signal Y and color difference signals Cr, Cb. After the Y/C conversion, the compression/decompression circuit 54 compresses the image data in, for example, the JPEG format, and outputs the data in a predetermined file format. This compressed image data is stored in the memory card 23 through a media controller 56.

Also connected to the data bus 57 are an AE/AWB detection circuit and an AF detection circuit (both not shown). The AE/AWB detection circuit determines a combination of a shutter speed and an aperture stop value, and calculates the amount of correction for white balance, depending on the calculated exposure amount. The AF detection circuit moves the focusing lens 32 and determines the position of maximum contrast. The CPU 37 places the focusing lens 32 in the maximum contrast position.

The SDRAM 42 is a working memory to temporarily store the image data, and also a place where a control program and other necessary programs of the digital camera 10 are loaded. The SDRAM 42 has a VRAM area to store a through image, which is updated at the above-mentioned frame rate.

The CPU 37 retrieves the control program from an EEPROM 58 and runs it to control all the components of the digital camera 10. The EEPROM 58 contains the control program and various set-up information of the digital camera 10. The EEPROM 58 further carries an optical distortion correction coefficient table (hereinafter, optical correction table) 60 and a wide-angle distortion correction coefficient table (hereinafter, wide-angle correction table) 61.

An optical correction table 60 contains coefficients (parameters) of a coordinate transform function to correct optical distortion of a captured image. In particular, the optical correction table 60 contains a plurality set of coefficients An (n=1, 2, 3, . . . ) for each focal length of the taking lens 17. Each coefficient set is determined in considering the optical distortion at each focal length derived from the configuration of a lens used.

The wide-angle correction table 61 contains coefficients (parameters) of a coordinate transform function to correct wide-angle distortion of a captured image, and contains a plurality of coefficient sets for different magnitudes of the wide-angle distortion.

A distortion correction section 62 includes a correction amount calculating section 63, a focal length determining section 64 and a distortion evaluation section 65. The distortion correction section 62 applies the coordinate transform processing to the unprocessed image data of a principal image (hereinafter, raw principal image data), and corrects distortion and wide-angle distortion.

The focal length determining section 64 figures the focal length of the taking lens 17 at the time of photography, based on the position of the zooming lens 31 in the lens unit 12 used, and correlates the focal length as focal length data with the image data, and then stores the focal length data to the SDRAM 42.

Based on the focal length data, the distortion evaluation section 65 evaluates the magnitude of the wide-angle distortion of the captured image. The evaluated magnitude is correlated with the image data, and stored as distortion data to the SDRAM 42.

The correction amount calculating section 63 applies the coordinate transform processing (image conversion processing) to the raw principal image data, causing the image to have positive or negative distortion with the same magnitude as the optical distortion due to the distortion aberration of the taking lens 17. This coordinate transform processing is performed using a transform function of, for example, $R=\Sigma An \times r^n = A1 \times r + A2 \times r^2 + A3 \times r^3 + \ldots$, wherein r is a height of each pixel from the center of the original image, while R is a height of each pixel after the coordinate transform processing. Additionally, the coefficients An (A1, A2, A3, . . . ) are parameters to determine the characteristic of the transform function, and replaced with the coefficients in the optical correction table 60 or the wide-angle correction table 61.

Figure 4A:
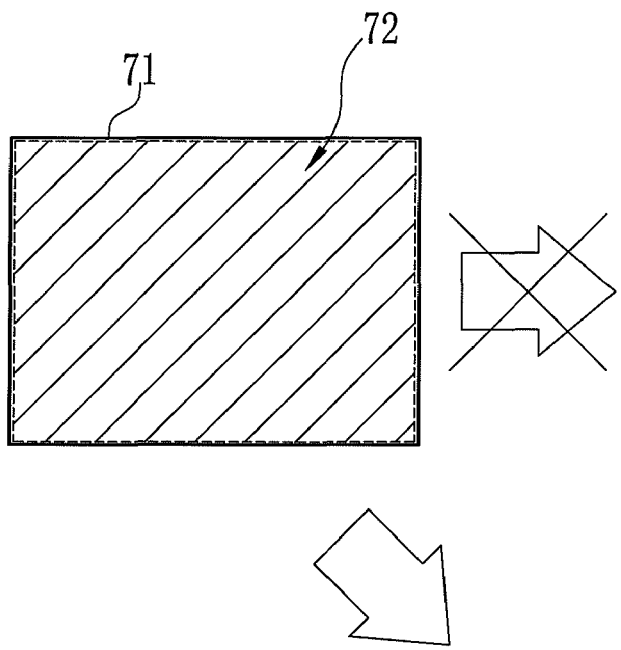
FIG. 4A to FIG. 4D are explanatory views illustrating an image conversion processing to produce an image with negative distortion.

To correct the wide-angle distortion, when the coordinate transform processing is applied to raw principal image data using the coefficients in the wide-angle correction table 61, the resultant image always has barrel distortion. Namely, the image shrinks into a barrel form after the coordinate transform processing in the correction amount calculating section 63. In this case, as shown in FIG. 4A and FIG. 4B, an image 72 after the processing may be narrower than a picture frame 71 of the original image, resulting in having a blank portion 74 with no image data at the periphery.

Figure 4B:
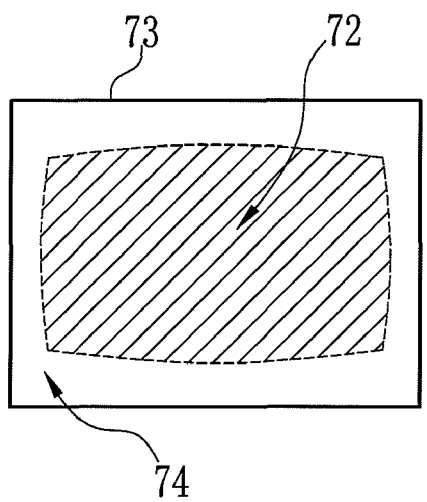
Figure 4C:
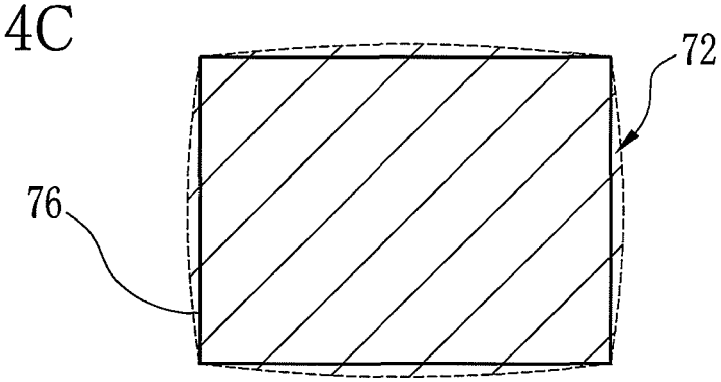
Figure 4D:
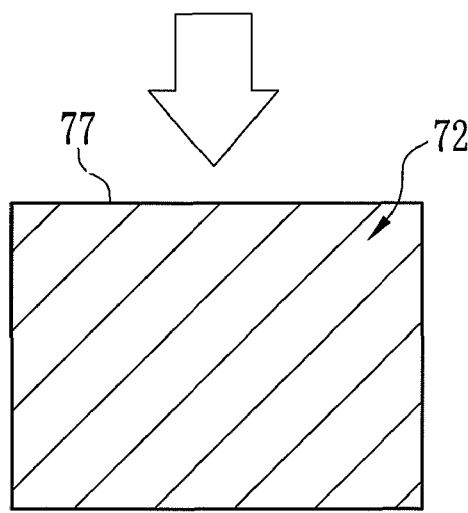

To solve this problem of FIG. 4B, the coefficient An is determined such that the image is enlarged when it changes to a barrel form. One example is A1>1. With the coefficient An thus determined, the image 72 is firstly enlarged as shown in FIG. 4C and then, as shown in FIG. 4D, the image within an area 76 as large as a picture frame 71 becomes an image 77 after the coordinate transform processing.

Instead of A1>1, the coefficient can be A1<1. In this case, the higher-order term coefficients (A2, A3, . . . ) are adjusted to enlarge a whole image.

The optical correction table 60, on the other hand, contains the coefficient sets for correcting the positive and the negative distortion depending on the distortion aberration of the lens. Therefore, when the coordinate transform processing is applied to raw principal image data, the positive distortion occurs to the original image on some occasion, and the negative distortion does on another occasion.

When the positive distortion is corrected, the image is enlarged, similar to the coordinate transform processing using the wide-angle correction table 61, so as not to lose the image periphery. When the negative distortion is corrected, the image is enlarged such that the magnification increases with distance from the center. In either case, at least a portion of the image is enlarged, and the image after the processing will have the pixels which the original image does not. Such pixels are, however, interpolated with the data of the neighboring pixels.

Figure 5A:
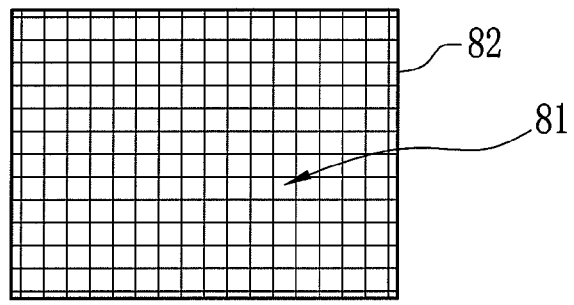
FIG. 5A to FIG. 5C are explanatory views of optical distortion.
Figure 5B:
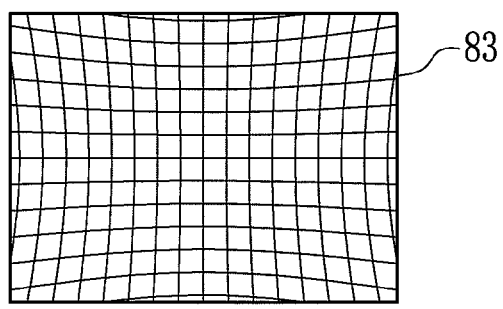
Figure 5C:
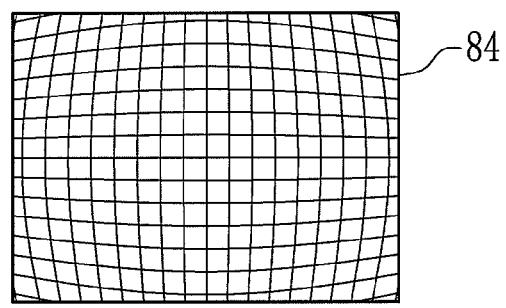

Next, the operation of the digital camera 10 with the above configuration is explained. For example, when an image of a grid is captured from the front, the ideal image will look identical to the actual grid, such as shown in FIG. 5A, where grids 81 are equally spaced at anywhere in an image 82. In reality, however, the optical distortion is caused to the image due to the distortion aberration of the taking lens. For example, capturing an image with the taking lens 17 of the digital camera 10 being at the telephoto side will produce so-called pincushion distortion (hereinafter, positive distortion), as shown in FIG. 5B, where a figure is more enlarged at the periphery of an image 83 when compared to the ideal image. To the contrary, capturing an image with the taking lens 17 at the wide-angle side will produce so-called barrel distortion (hereinafter, negative distortion), as shown in FIG. 5C, where a figure is more reduced at the periphery of an image 84 when compared to the ideal image.

Positive or negative, and the magnitude of the distortion depend on the configuration and the focal length of the taking lens 17 to be used. Moreover, the distortion may sometimes be complex that the sign of the distortion inverts depending on the height of figures. Accordingly, the following embodiments are explained with the taking lens that produces the positive distortion at the telephoto side and the negative distortion at the wide-angle side, unless otherwise the characteristic of the taking lens is stated.

As is well known, the positive distortion of an image is corrected by the image conversion processing to cause the negative distortion of the same magnitude. Similarly, the negative distortion of an image is corrected by the image conversion processing to cause the positive distortion of the same magnitude.

Apart from the above optical distortion, when a three-dimensional subject is captured, the wide-angle distortion occurs to elongate the subject image radially from the center of a picture frame.

Figure 6:
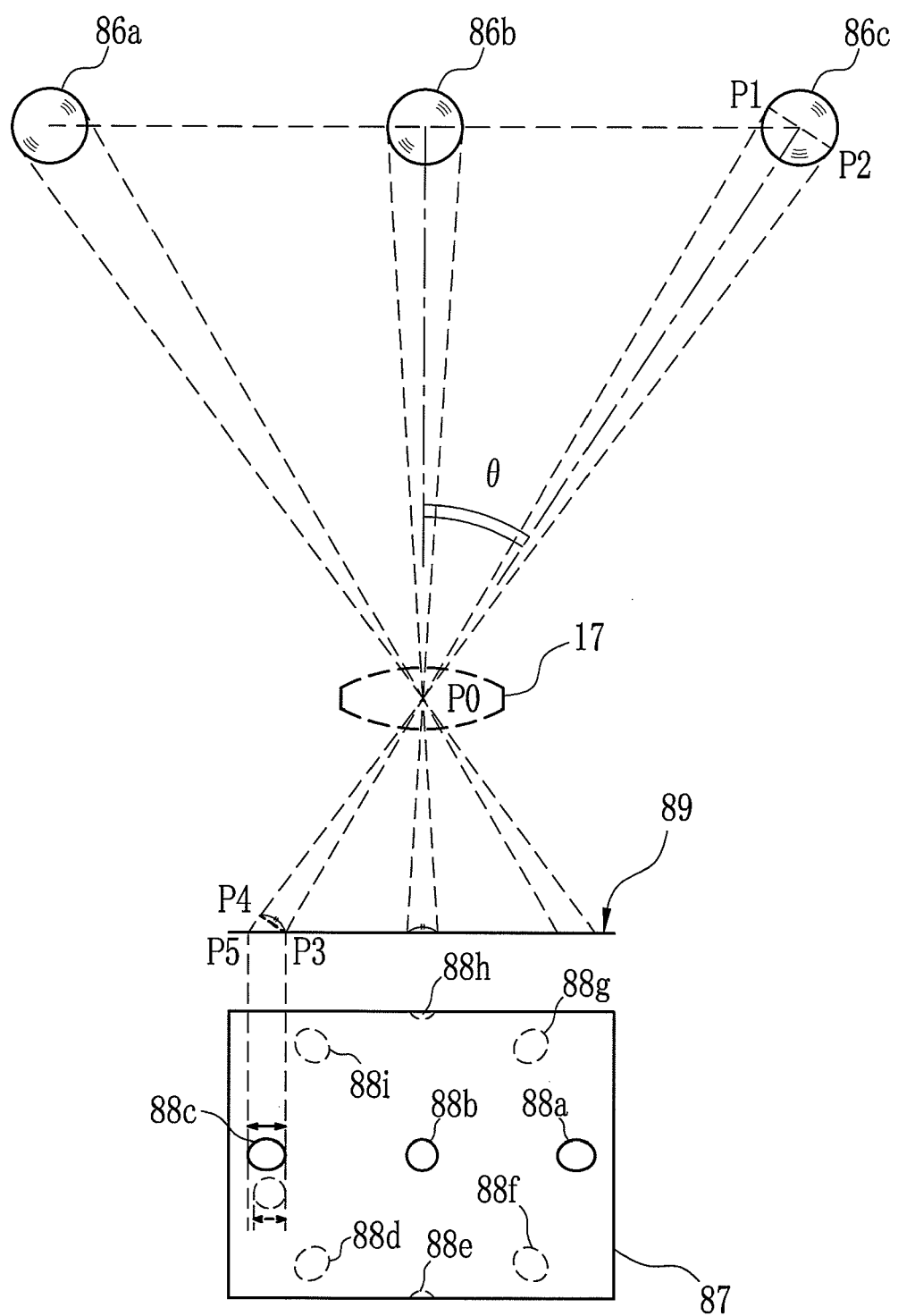
FIG. 6 is an explanatory view illustrating the mechanism of wide-angle distortion.

For example, as shown in FIG. 6, when the digital camera 10 captures an image of horizontally aligned three spheres 86a to 86c, in the center of a captured image 87 appears a FIG. 88b of the sphere 86b that resides in front of the taking lens 17. This FIG. 88b is a round disk, and nothing less than an ideal shape of the sphere 86b viewed from the front.

Here, since the spheres 86a to 86c are all three-dimensional, a diameter of the sphere 86c that resides diagonally in front of the taking lens 17 is perceived as a segment P1P2 when viewed from the taking lens 17. When the light of the sphere 86c is focused through the taking lens 17 onto a light receiving surface 89 of the CCD 39, a triangle P0P1P2 is geometrically very similar to a triangle P0P3P4, but the triangle P0P1P2 is not similar to a triangle P0P3P5. As a result, the segment P1P2 is elongated from the ideal segment P3P4 to a segment P3P5, and focused on the light receiving surface 89. In this manner, the FIG. 88c of the sphere 86c that has a large angle of incidence θ and resides in the periphery of a picture frame is radially elongated from the center of the image 87. The same applies to FIGS. 88a and 88d to 88i.

As above, the wide-angle distortion results from the geometric positions of a subject, a taking lens and a light receiving surface, and from a subject being three-dimensional, and occurs independently of the optical distortion or such image distortion due to the aberration of the taking lens 17. Especially, the wide-angle distortion is more prominent to a figure with large angle of incidence to the taking lens 17.

Figure 7:
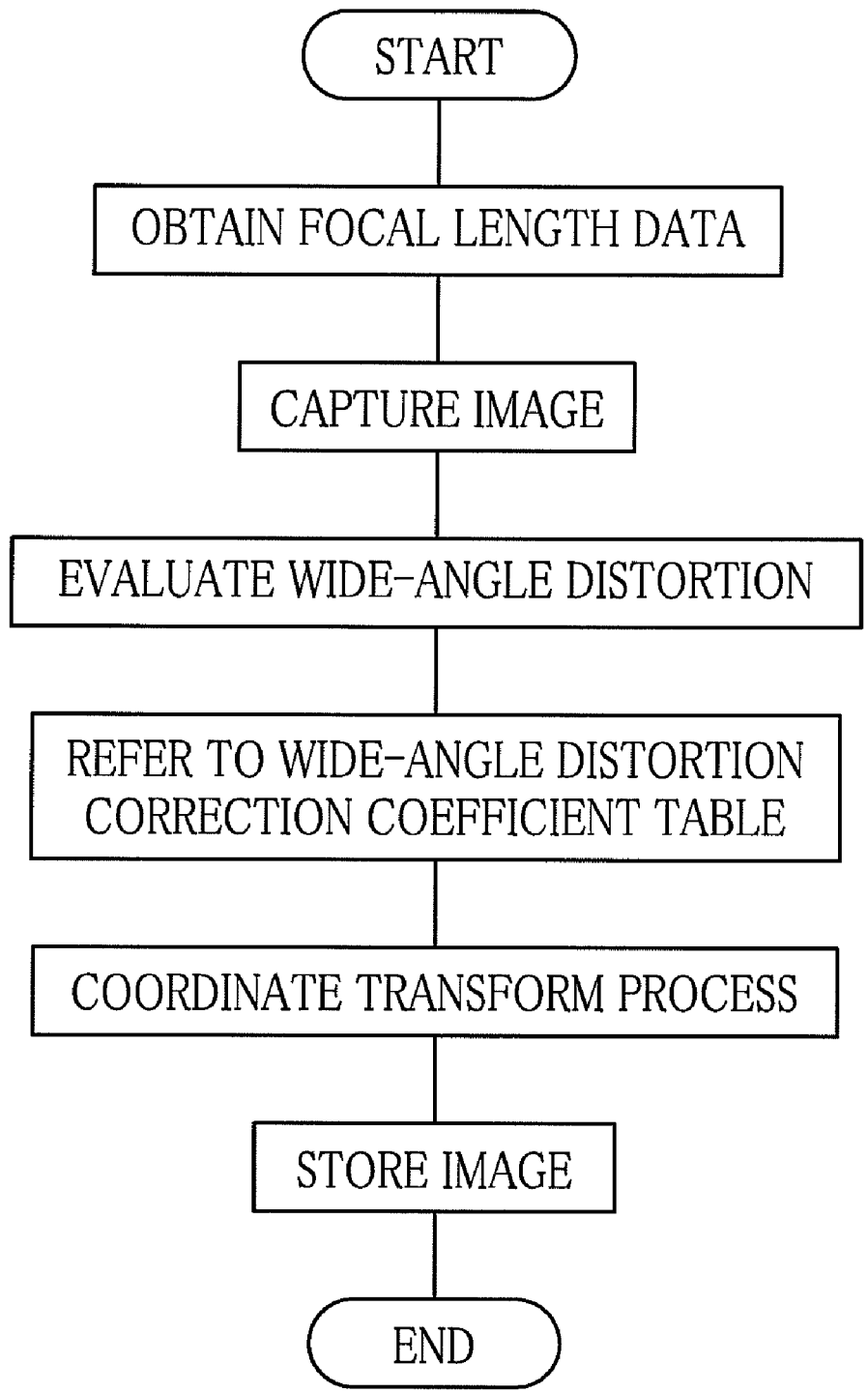
FIG. 7 is a flow chart of operation of the digital camera according to the first embodiment.

Next, with reference to FIG. 7, correction to the wide-angle distortion is explained. The focal length data of the taking lens 17 is obtained when a principal image is captured. Then, based on the focal length data, magnitude of the wide-angle distortion is evaluated.

Based on the magnitude of the wide-angle distortion, the distortion correction section 62 selects a coefficient from the wide-angle correction table 61, and applies the coordinate transform processing to raw principal image data using the selected coefficient. The negative distortion corresponding to the magnitude of the wide-angle distortion occurs to cancel out the radially-elongating wide-angle distortion, and an image corrected for the wide-angle distortion is produced accordingly.

While the wide-angle distortion is corrected in this manner, it is more convenient if one of the wide-angle distortion and the optical distortion can be selectively corrected. Namely, the digital camera may possibly be configured to select a wide-angle distortion correction function or an optical distortion correction function depending on, for example, the image capture mode selected, or provided with a selector button to allow the user to select one of these functions.

Figure 8:
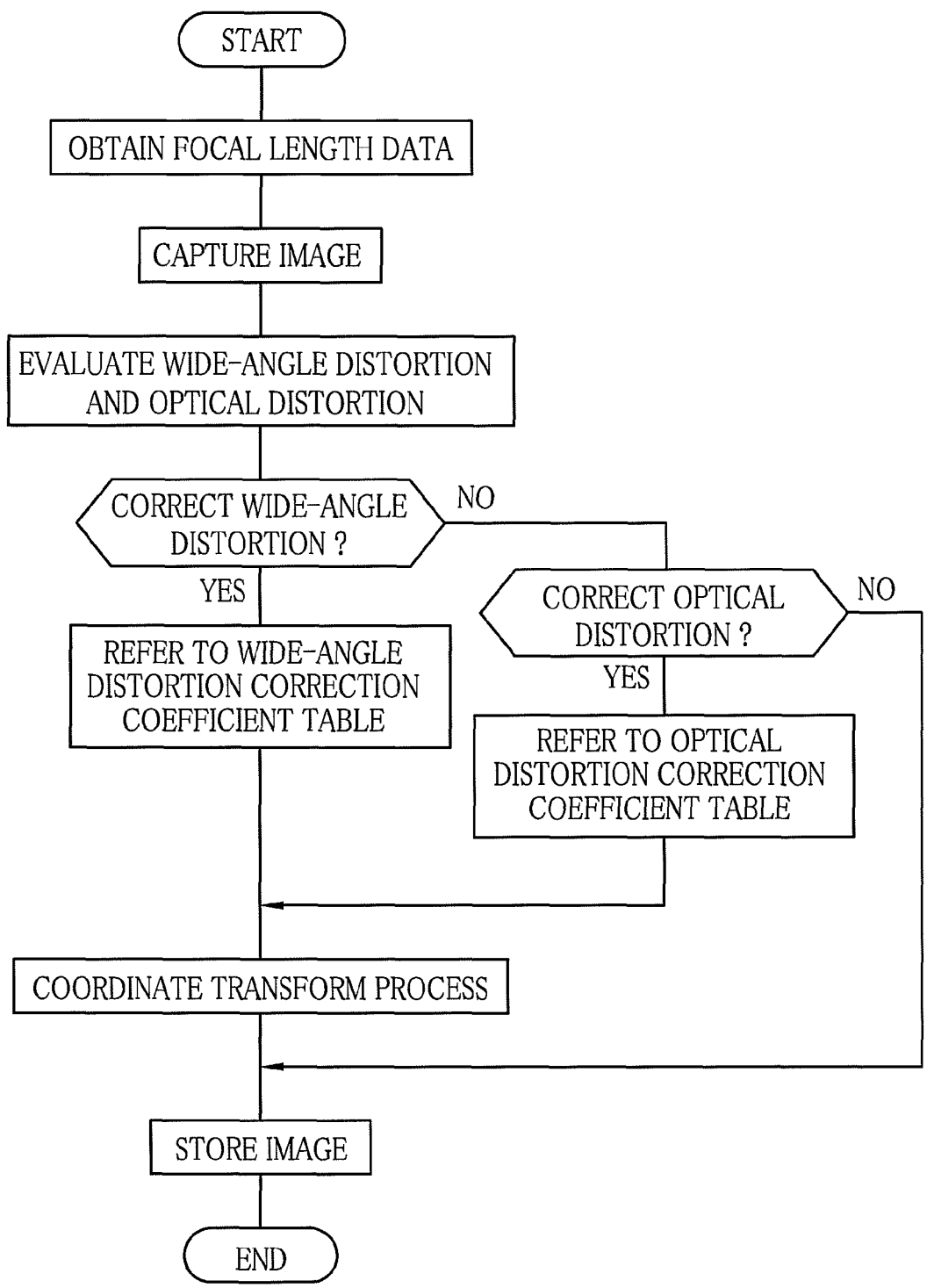
FIG. 8 is a flow chart for selectively correcting one of the wide-angle distortion and the optical distortion.

FIG. 8 illustrates an embodiment where the wide-angle distortion correction function or the optical distortion correction function is selected depending on the image capture mode. Based on the focal length data obtained during image capture, the magnitude of the wide-angle distortion and the optical distortion is evaluated, and stored as the distortion data. When the wide-angle distortion correction function is selected, the wide-angle distortion is then corrected by the coordinate transform processing as described.

When the optical distortion correction function is selected, on the other hand, the distortion correction section 62 selects a coefficient of the coordinate transform processing from the optical correction table 60, depending on the focal length.

For example, an image captured with the taking lens 17 at the wide-angle side will have the negative distortion, but with the coefficient selected according to the focal length, this negative distortion due to the aberration of the taking lens 17 is cancelled out by the positive distortion caused in the coordinate transform processing, and an image corrected for the wide-angle distortion is produced.

Alternatively, an image captured with the taking lens 17 at the telephoto side will have the positive distortion, but the coefficient to cause the negative distortion is selected from the optical correction table 60. The positive distortion due to the distortion aberration of the taking lens 17 is cancelled out by the negative distortion caused in the coordinate transform processing, and an image corrected for the optical distortion is produced.

In this manner, selecting and correcting one of the wide-angle distortion or the optical distortion allow easy production of an image properly corrected depending on the type of subject and the photographic conditions.

Since the EEPROM 58 has a limited memory size, the optical correction table 60 and the wide-angle correction table 61 cannot always contain a variety of the coefficients for each of the taking lens 17. Also, for example, when the focal length or other parameters are manually adjusted, an appropriate coefficient to correct the distortion on the adjusted focal length may not be found in the optical correction table 60 and the wide-angle correction table 61. In this situation, the lacking coefficients are interpolated with the coefficients in the correction tables.

Second Embodiment

While in the above embodiment the coordinate transform processing to cause the negative distortion is applied to an image with the wide-angle distortion, the distortion aberration of a lens may be used to correct the wide-angle distortion. This is explained below as a second embodiment, in which the same components are designated by the same numerals as the first embodiment, and the detailed explanation thereof are omitted.

Figure 9:
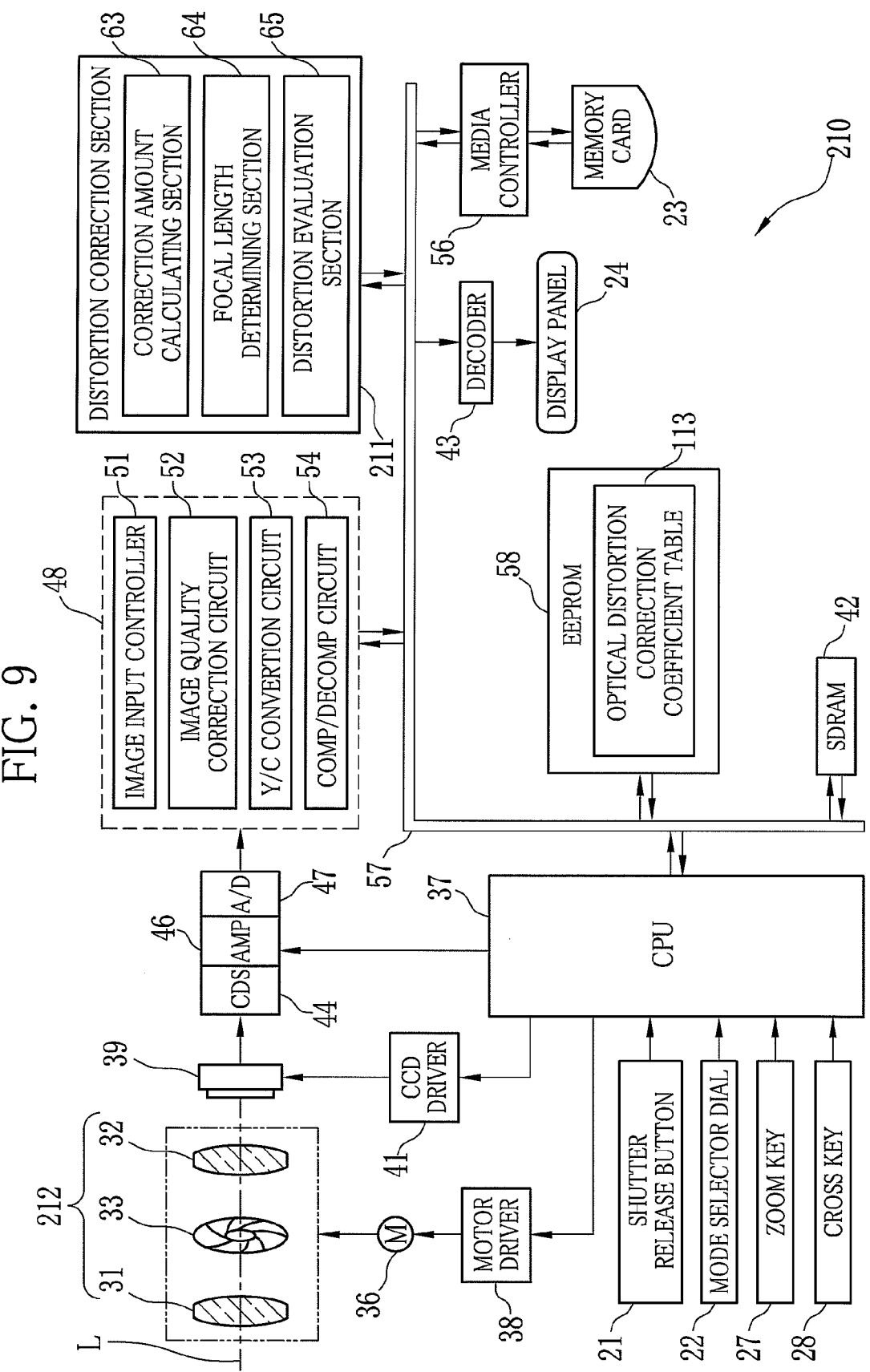
FIG. 9 is a block diagram illustrating an electrical configuration of the digital camera according to a second embodiment.
Figure 10:
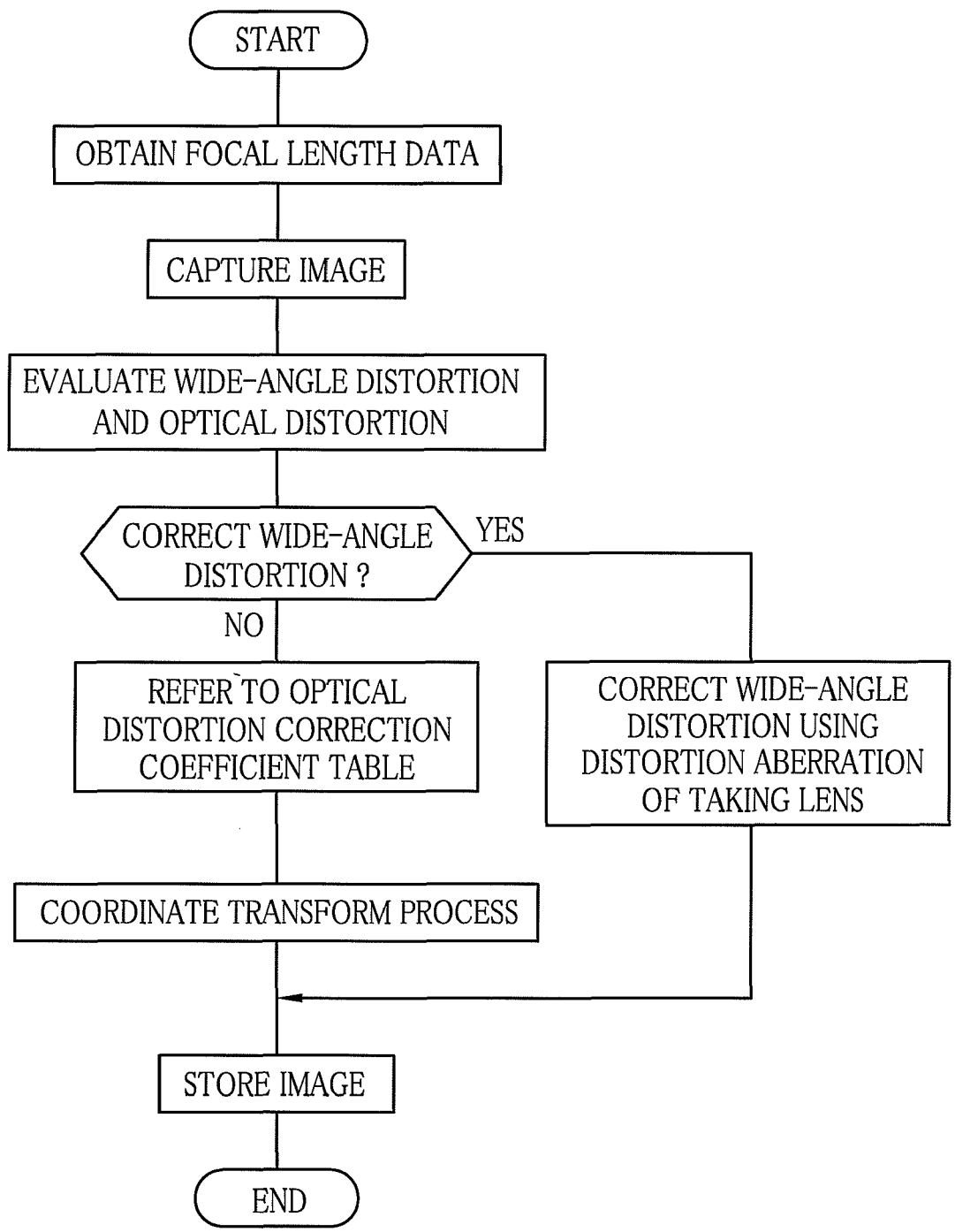
FIG. 10 is a flow chart of operation of the digital camera according to the second embodiment.

In FIG. 9, a taking lens 212 has such optical characteristic that produces the negative distortion in at least the wide-angle side. Nonetheless, it is more preferred that the taking lens 212 always produces the negative distortion across the wide-angle end to the telephoto end. In addition, a digital camera 210 can enables and disables (on/off) the wide-angle correction function. Therefore, as shown in FIG. 10, when an image is captured with the wide-angle distortion correction function being off, a distortion correction section 211 applies the coordinate transform processing for optical distortion correction to the raw principal image data, and produces an image corrected for the optical distortion.

When an image is captured with the wide-angle distortion correction function being on, the distortion correction section 211 disables the coordinate transform processing in the correction amount calculating section 63. Namely, the distortion correction section 211 does not apply the coordinate transform processing to the captured image. As a result, the optical distortion to shrink the image due to the distortion aberration of the taking lens 212 and the wide-angle distortion to elongate the image cancel each other out, and an image corrected for the wide-angle distortion is produced.

As described, the digital camera 210 corrects the wide-angle distortion using the distortion aberration of the taking lens 212, and eliminates the need of the image processing to correct the wide-angle distortion. This renders it possible to produce an image corrected for the wide-angle distortion easily in a short time. In addition, it is not necessary to store the coefficients for the wide-angle distortion correction in the EEPROM 58, a memory capacity can be saved.

While in the digital camera 210 the wide-angle distortion is corrected during the wide-angle distortion correction function is enabled, and the optical distortion is corrected during the wide-angle distortion correction function is disabled, in addition to this, it may be possible to selectively correct the optical distortion and the wide-angle distortion depending on the characteristic of the taking lens 212 attached.

For example, during the wide-angle distortion correction function is on, the digital camera 210 may be set to disable the image conversion processing of the correction amount calculating section 63 only when the optical distortion due to the distortion aberration of the taking lens 212 has enough magnitude to reduce the wide-angle distortion, instead of always disabling the image conversion processing.

Figure 11:
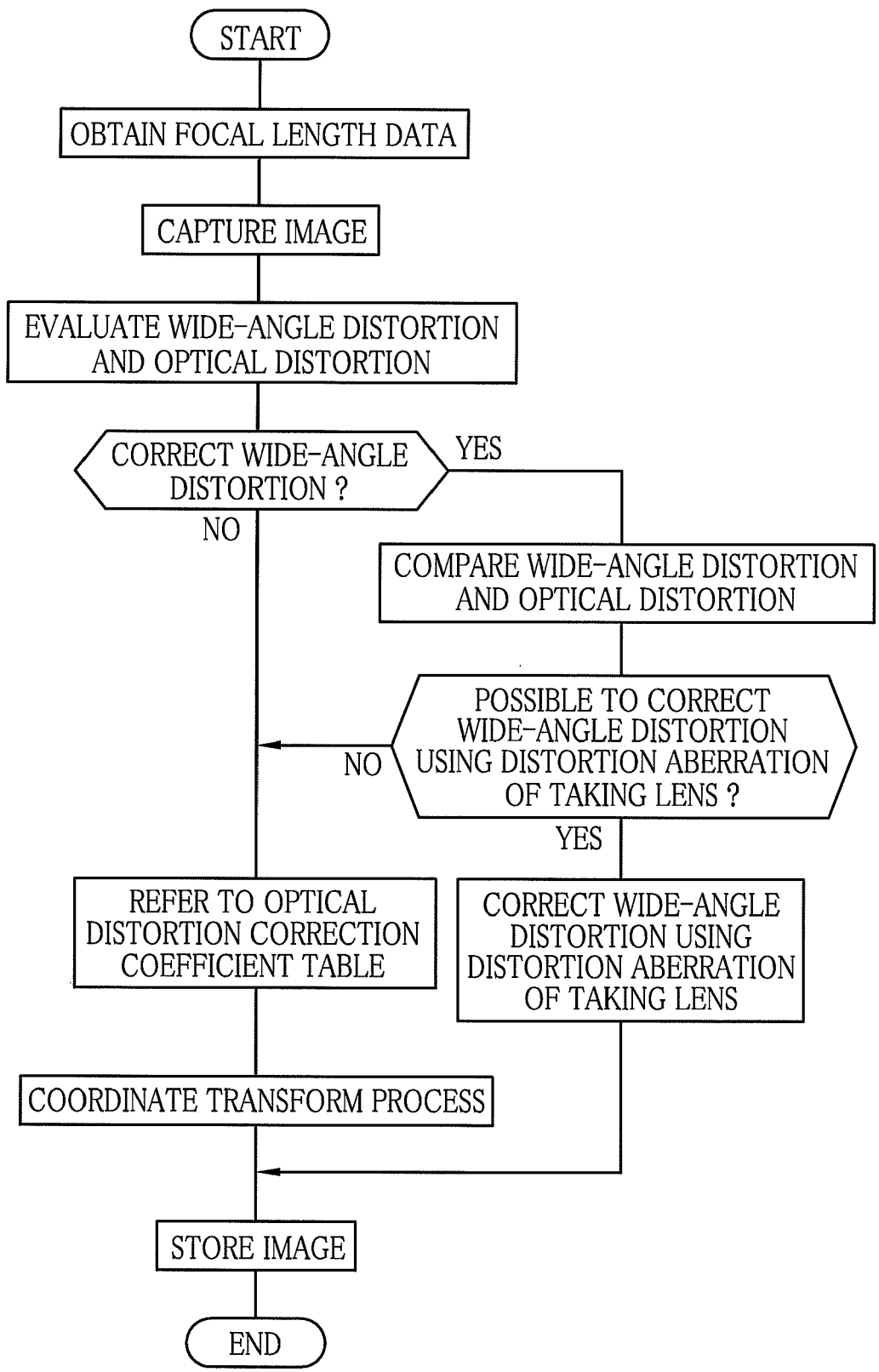
FIG. 11 is a flow chart for determining whether or not to correct the wide-angle distortion based on the characteristic of a taking lens.

In other words, as shown in FIG. 11, when an image is captured with the wide-angle distortion correction function being off, the distortion correction section 211 selects a coefficient from an optical correction table 113 based on the distortion data, and applies the coordinate transform processing for optical distortion correction to the raw principal image data using the selected coefficient.

On the other hand, when an image is captured with the wide-angle distortion correction function being on, the distortion correction section 211 compares the optical distortion and the wide-angle distortion of the captured image based on the distortion data. Then, if the optical distortion has a negative sign and enough amount to correct the wide-angle distortion, the distortion correction section 211 disables the coordinate transform processing of the correction amount calculating section 63 and corrects the wide-angle distortion using the negative distortion due to the distortion aberration of the taking lens 212.

If the optical distortion has a positive sign, however, the distortion correction section 211 applies the coordinate transform processing to the raw principal image data in the correction amount calculating section 63 even when the wide-angle distortion correction function is on, and corrects the optical distortion instead of the wide-angle distortion.

Even when the optical distortion has a negative sign and the wide-angle distortion correction function is enabled, if the optical distortion does not have the magnitude to correct the wide-angle distortion, the distortion correction section 211 again applies the coordinate transform processing in the correction amount calculating section 63 and corrects the optical distortion instead of the wide-angle distortion.

Furthermore, if the optical distortion is so large to correct the wide-angle distortion excessively and reduce the image smaller than an ideal shape to reveal the negative distortion, the distortion correction section 211 applies the coordinate transform processing even when the wide-angle distortion correction function is on, so as to correct the optical distortion instead of the wide-angle distortion.

In this manner, the digital camera 210 decides which to correct the wide-angle or the optical distortion, based on the characteristic of the taking lens 212, and produces an image properly corrected for distortion depending on the condition at the time of image capture. It can also prevent the situation where the wide-angle distortion is not sufficiently corrected, and on top of it, the optical distortion becomes prominent.

Third Embodiment

While in the first and second embodiments one of the wide-angle and the optical distortion is selectively corrected depending on the setting of the image capture modes, it may be possible to selectively correct one of the two depending on the type of a subject. This is explained below as a third embodiment, in which the same components are designated by the same numerals as the above embodiments, and the detailed explanation thereof is omitted.

Figure 12:
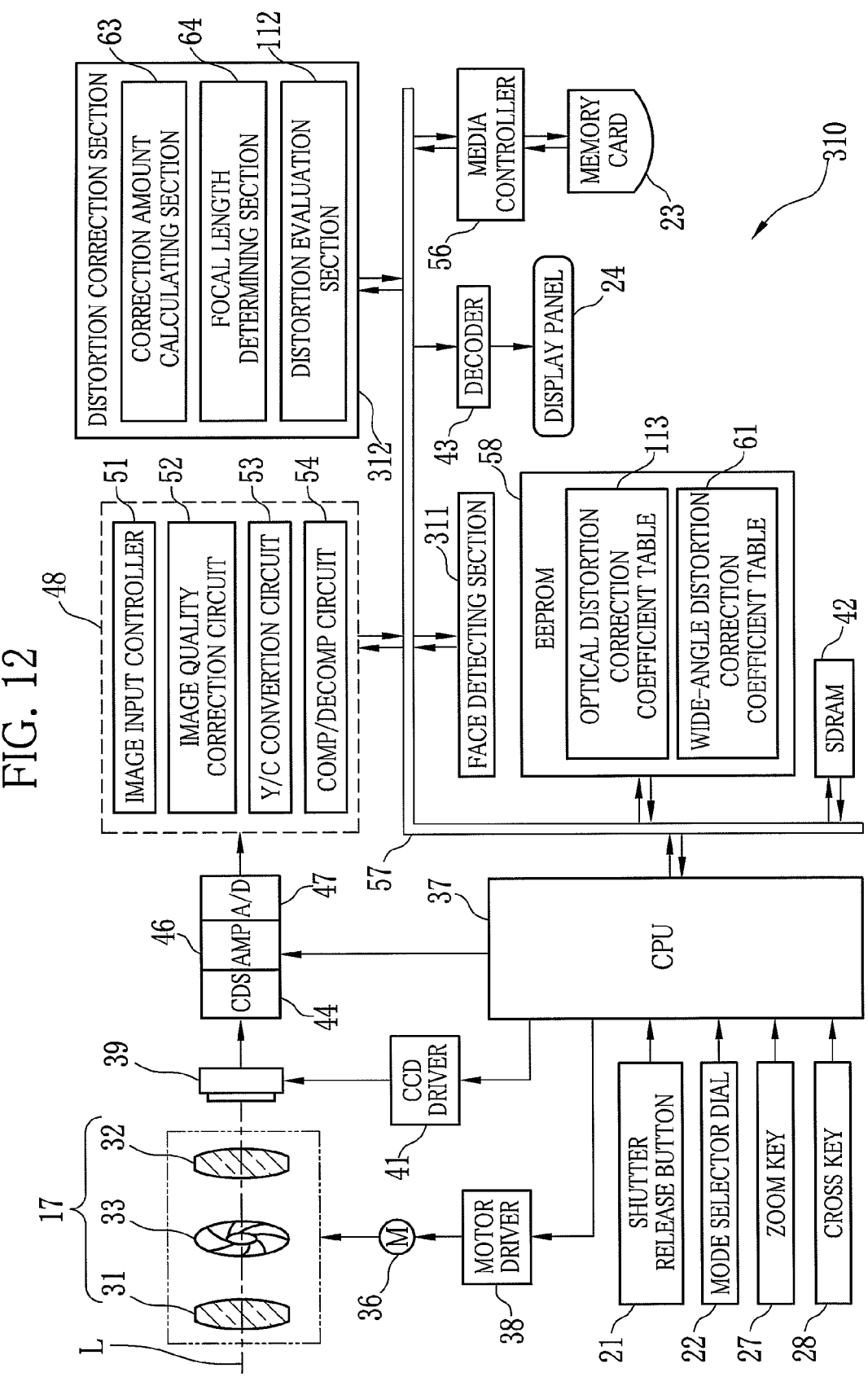
FIG. 12 is a block diagram illustrating an electrical configuration of the digital camera according to a third embodiment.

As shown in FIG. 12, a digital camera 310 includes a face detecting section 311 to detect human faces in a picture frame. The obtained information, such as presence/absence of human faces, the position, size, number of the detected faces, is stored as face detection data to the SDRAM 42. The face detection data is retrieved by a distortion correction section 312, and used to decide which to correct the optical distortion or the wide-angle distortion. The face detection is performed by so-called a pattern matching method that compares the captured image with template images of eyes, nose, mouth and other characteristic parts, but a common method such as detection of flesh color pixels in an image may be used instead.

The distortion correction section 312 corrects the wide-angle distortion or the optical distortion. Decision on which to correct the wide-angle distortion and the optical distortion is made based on the face detection data.

Figure 13:
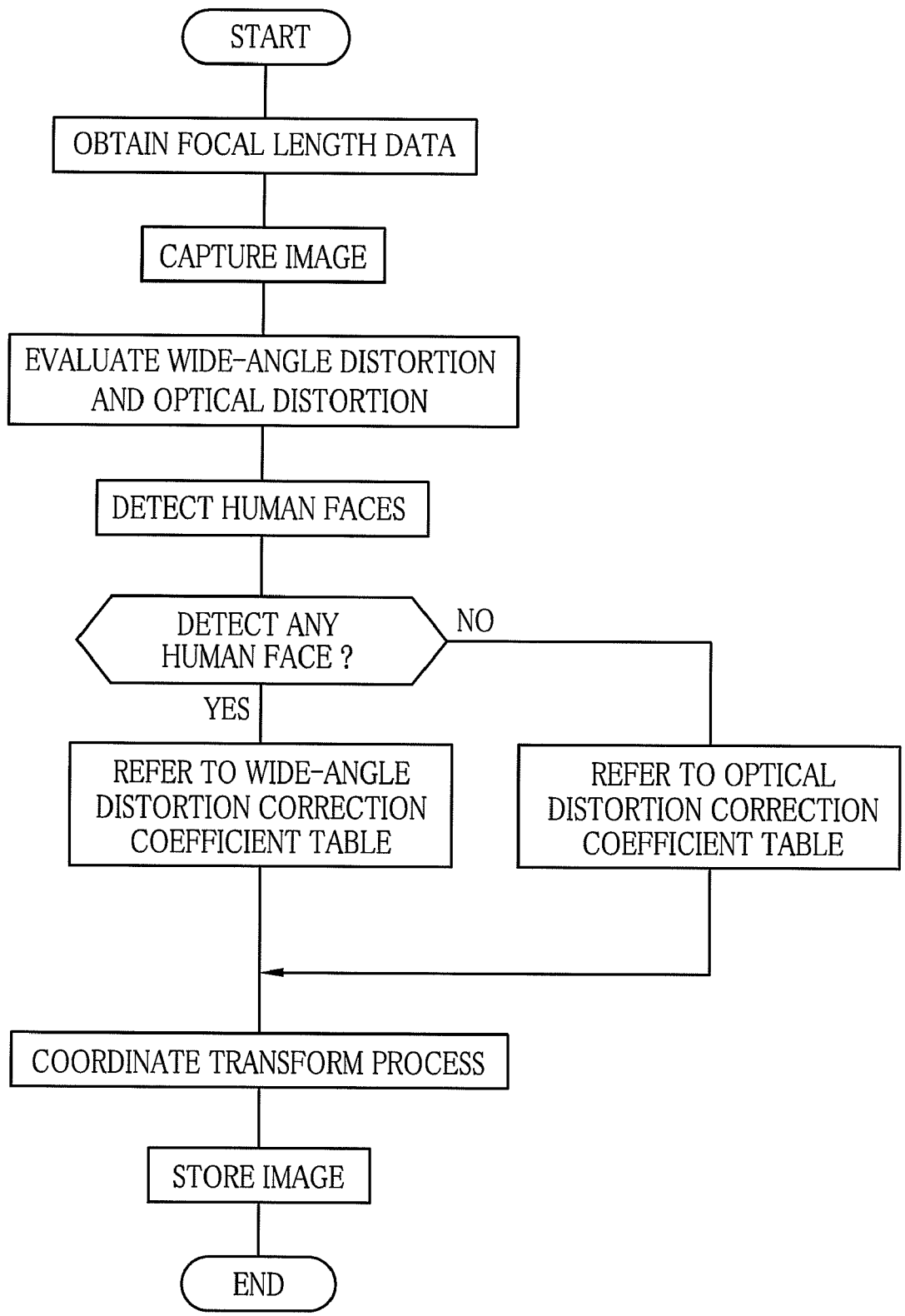
FIG. 13 is a flow chart of operation of the digital camera according to the third embodiment.

As shown in FIG. 13, when an image is captured with the digital camera 310, the focal length data is obtained, as well as the image of a subject. Then, based on this focal length data, the distortion data showing the magnitude of the wide-angle distortion and the optical distortion is obtained and stored.

In this instance, the face detecting section 311 detects human faces in the picture frame, and the information such as presence/absence of human faces, the position and size of the detected faces is stored as the face detection data.

When a human face is detected, the distortion correction section 312 selects an appropriate coefficient from the wide-angle correction table 61, based on the distortion data, and applies the coordinate transform processing for wide-angle distortion correction to the raw principal image data using the selected coefficient.

When a human face is not detected, on the other hand, the distortion correction section 312 selects an appropriate coefficient from the optical correction table 113, based on the focal length, and applies the coordinate transform processing for optical distortion correction using the selected coefficient.

In this manner, the digital camera 310 decides which to correct the wide-angle or the optical distortion, based on the result of the face detection, and automatically performs the distortion correction appropriate to the subjects of the captured image.

To be exact, as shown in FIG. 14A, when human faces 317*a*, 317*b* are detected in a picture frame 316*a* of the captured image, the digital camera 310 applies the coordinate transform processing for wide-angle distortion correction to the image within the picture frame 316*a*, and stores in the memory card 23 a picture frame 316*b* which has been corrected for the wide-angle distortion. Accordingly, the optical distortion is promoted on a background 318 in the picture frame 316*b*. However, the faces 317*a*, 317*b* in the picture frame 316*b* are corrected to be nearly identical to their actual shapes, whereas the faces 317*a*, 317*b* in the picture frame 316*a* are different from their actual shapes due to the wide-angle distortion.

On the other hand, as shown in FIG. 14B, when no human face is detected in a picture frame 316*c*, the digital camera 310 applies the coordinate transform processing for optical distortion correction to the picture frame 316*c*, and stores to the memory card 23 a picture frame 316*d* corrected for the optical distortion. Accordingly, the wide-angle distortion is still somewhat noticeable in the picture frame 316*d*. However, buildings 319 in the picture frame 316*d* are corrected to have straight lines that they should have, whereas the buildings 319 in the picture frame 316*c* are distorted into the barrel form.

In this manner, the digital camera 310 automatically performs the wide-angle distortion correction, instead of the optical distortion correction, to a group shot or such a person-related image where the effect of the wide-angle distortion to a person, a main subject, is more important issue than the effect of the optical distortion correction to a background. On the other hand, the optical distortion is automatically corrected if the captured image is a building-related image or an image of a rectilinear object where the optical distortion is more important issue than the wide-angle distortion. Therefore, with the digital camera 310, it is possible to easily produce the image corrected for the wide-angle distortion or the optical distortion depending on the type of the subject.

While in the third embodiment the wide-angle distortion correction or the optical distortion correction is selected based on whether or not human faces are detected, the selection may be made based on the size, number or position of the detected human faces or the combination thereof.

Figure 15:
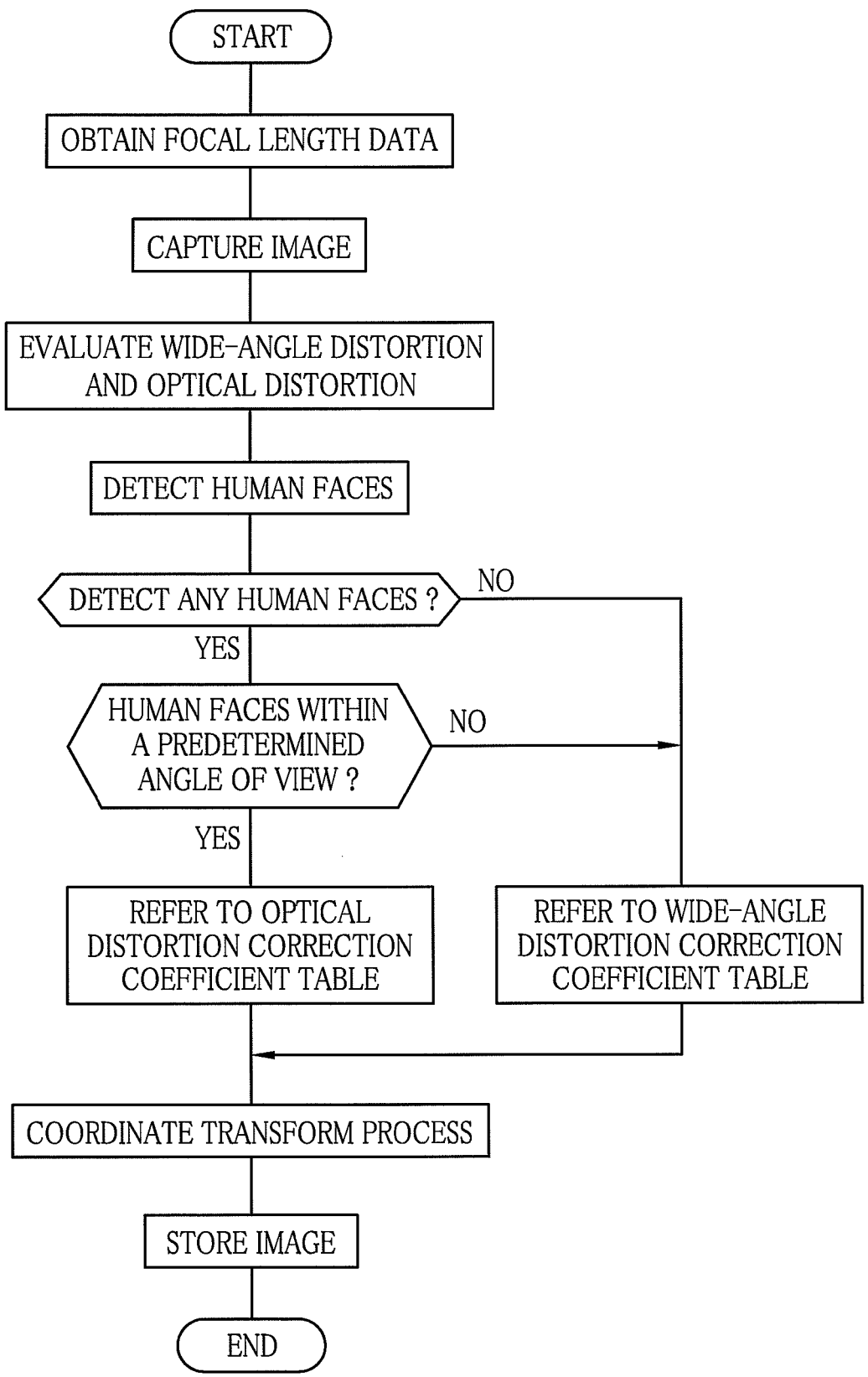
FIG. 15 is a flow chart for determining whether or not to correct the wide-angle distortion based on a position of human faces.

For example, as shown in FIG. 15, when no human face is detected in a captured picture frame, the distortion correction section 312 selects an appropriate coefficient from the optical correction table 113, depending on the focal length, and applies the coordinate transform processing for optical distortion correction to the raw principal image data using the selected coefficient.

When a human face is detected, on the other hand, the wide-angle distortion or the optical distortion is corrected depending on the position of the detected face. Namely, the distortion correction section 312 determines whether or not the detected face is within a predetermined angle of incidence (for example, 45 degrees of incidence on a diagonal line), based on the face detection data and the focal length data.

If the detected face is inside the predetermined angle of incidence, the distortion correction section 312 selects an appropriate coefficient from the optical correction table 113, based on the focal length, and applies the coordinate transform processing for optical distortion correction to the raw principal image data using the selected coefficient.

If the detected face is outside the predetermined angle of incidence, the distortion correction section 312 selects an appropriate coefficient from the wide-angle correction table 61, based on the distortion data, and applies the coordinate transform processing for wide-angle distortion correction to the raw principal image data using the selected coefficient.

Since the wide-angle distortion correction or the optical distortion correction is selected on the basis of the position, for example, inside or outside of a predetermined angle of incidence, of the detected face in the picture frame, the distortion is automatically and properly corrected depending on the impact of the wide-angle distortion to the captured person.

Figure 16:
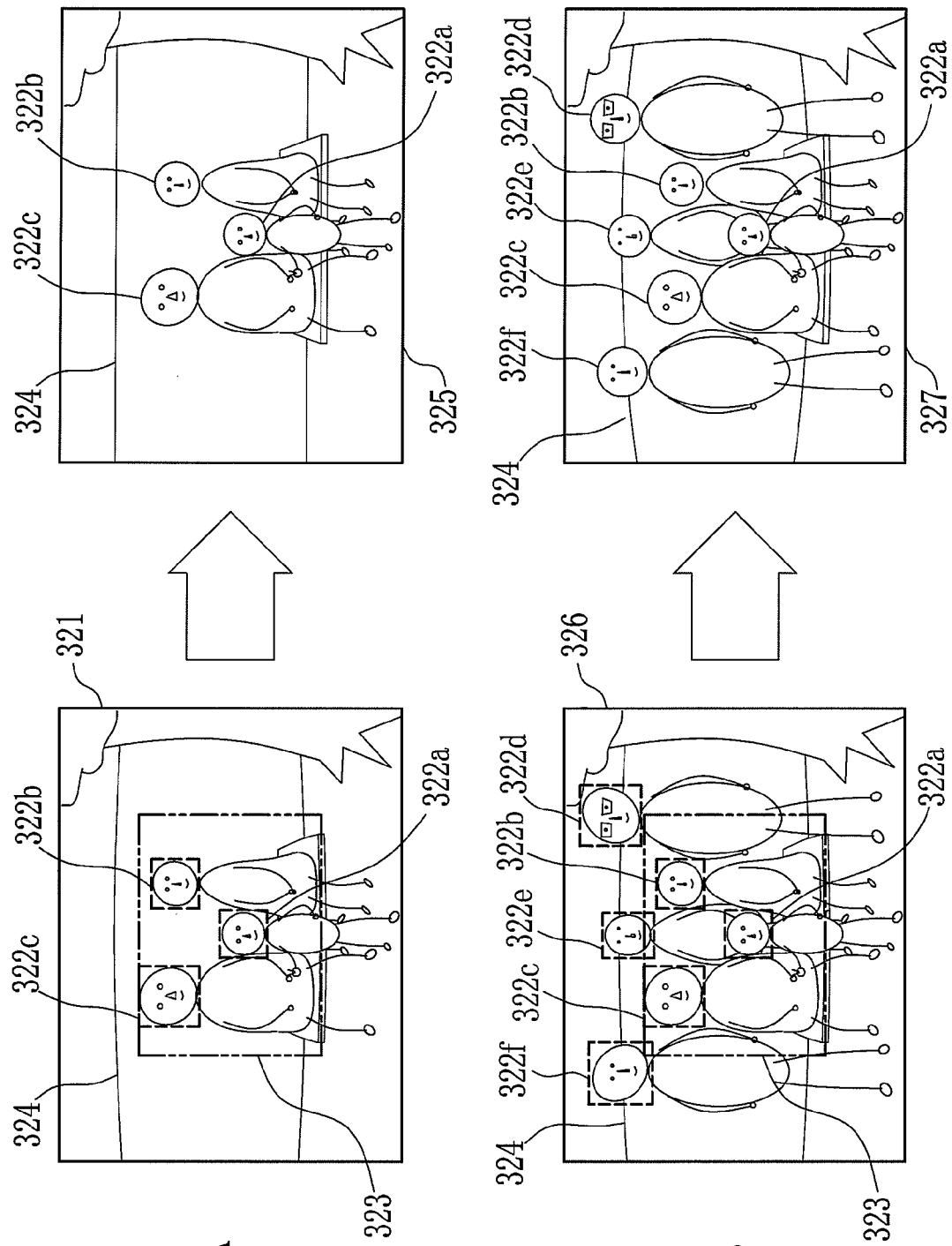
FIG. 16A and FIG. 16B are explanatory views illustrating image distortion correction based on a position of the human faces.

More concretely, as shown in FIG. 16A, when human faces 322*a* to 322*c* are detected in a picture frame 321, the positions of these faces are compared with an area 323 of a predetermined angle of incidence. In the picture frame 321, the faces 322*a* to 322*c* are all inside the area 323, and the wide-angle distortion is not really noticeable. Accordingly, the coordinate transform processing for optical distortion correction is applied to the picture frame 321, and an image 325 corrected for optical distortion on a background 324 is stored to the memory card 23.

Also, as shown in FIG. 16B, when human faces 322*a* to 322*f* are detected in a picture frame 326, the positions of these faces are compared with the area 323 of a predetermined angle of incidence. In the picture frame 326, while the wide-angle distortion is not really noticeable on the faces 322*a* to 322*c* which are inside the area 323, it is noticeable on the faces 322*d* to 322*f* which are outside the area 323. Accordingly, the coordinate transform processing for wide-angle distortion correction is applied to the picture frame 326, and an image 327 corrected for wide-angle distortion on faces 322*a* to 322*f* is stored to the memory card 23.

In this manner, the optical distortion is corrected when the human faces are inside the predetermined angle of incidence where the wide-angle distortion is unnoticeable, while the wide-angle distortion is corrected when the human faces are outside the predetermined angle of incidence where the wide-angle distortion is noticeable. Therefore, it is possible to easily produce the image corrected for the wide-angle distortion or the optical distortion depending on the magnitude of the wide-angle distortion on the human faces.

Additionally, if the wide-angle distortion correction or the optical distortion correction is selected depending on the size of a detected human face, the detection is automatically made not only on presence of a person, but also on whether or not the person is a main subject. This allows more effective distortion correction to the captured image.

While the third embodiment, similar to the first embodiment, corrects the wide-angle distortion by applying the coordinate transform processing to a captured image, the wide-angle distortion may be corrected using the optical distortion due to the distortion aberration of the taking lens, as in the second embodiment.

In the first to third embodiments, the image that has been corrected for either the wide-angle or optical distortion is stored to the memory card 23. It may, however, be possible to store both the images corrected for the wide-angle distortion (hereinafter, wide-angle distortion corrected image) and for the optical distortion (hereinafter, optical distortion corrected image) to the memory card 23.

Figure 17:
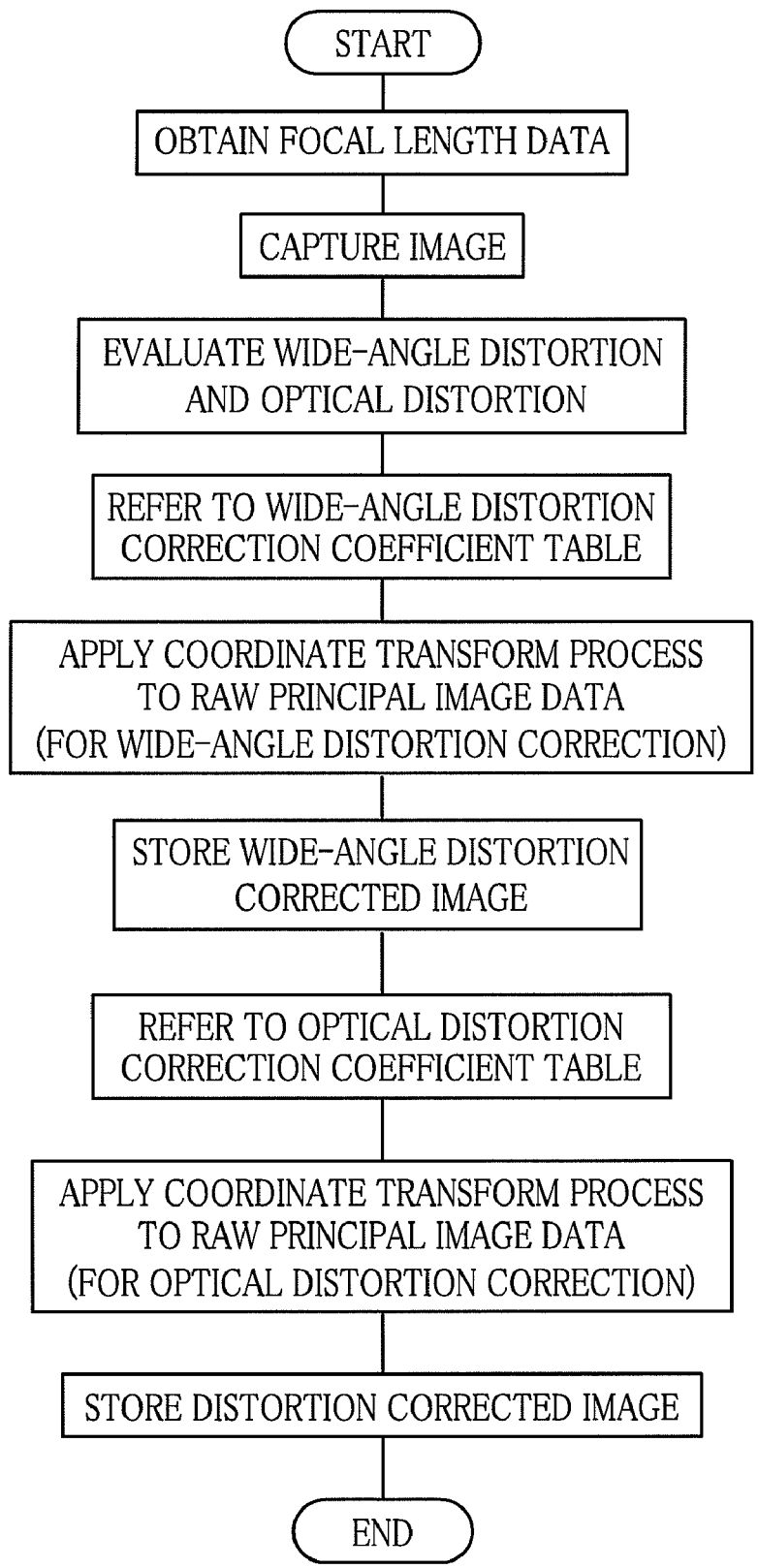
FIG. 17 is a flow chart for storing an optical distortion corrected image and a wide-angle distortion corrected image produced by a coordination transform processing.

For example, when the optical distortion is corrected by the coordinate transform processing just like the first embodiment, the coordinate transform processing for wide-angle distortion correction is applied to the image data temporarily stored in the SDRAM 42, such as shown in FIG. 17, and a wide-angle distortion corrected image is stored to the memory card 23. In this instance, the image data is not deleted from the SDRAM 42. The coordinate transform processing for optical distortion correction is then applied to the image data in the SDRAM 42, and an optical distortion corrected image is stored to the memory card 23. At this stage, the image data is deleted from the SDRAM 42.

Figure 18:
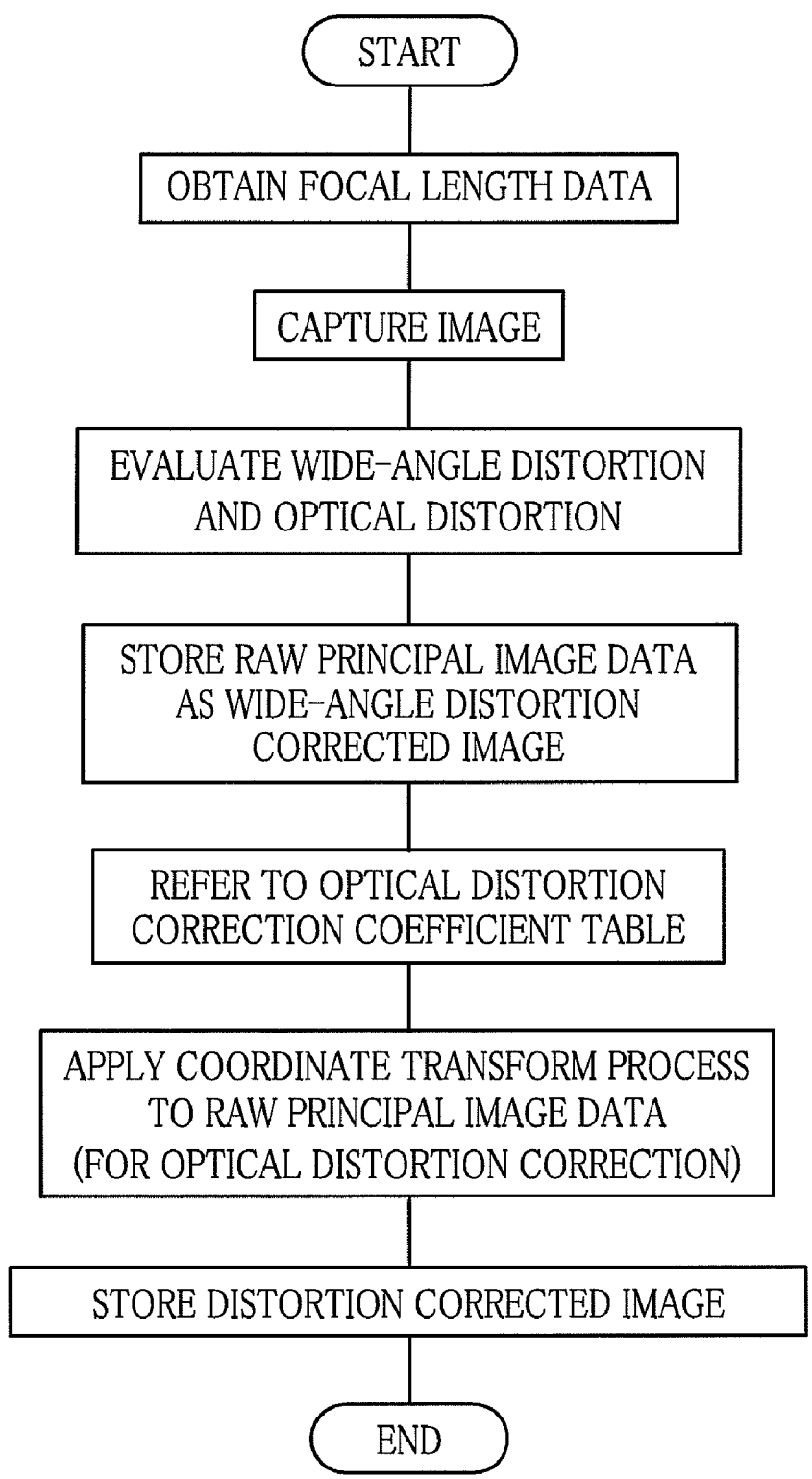
FIG. 18 is a flow chart for storing the optical distortion corrected image and a wide-angle distortion corrected image produced by using distortion aberration of the taking lens.

Alternatively, when the wide-angle distortion is corrected only with the negative distortion due to the distortion aberration of the taking lens just like the second embodiment, the image data temporarily stored in the SDRAM 42 is firstly stored as the wide-angle distortion corrected image to the memory card 23, as shown in FIG. 18. Again, the image data is not deleted in the SDRAM 42. The coordinate transform processing for optical distortion correction is then applied to the image data in the SDRAM 42, and the optical distortion corrected image is stored to the memory card 23. And finally, the image data is deleted from the SDRAM 42.

If the wide-angle distortion corrected image and the optical distortion corrected image are both stored at least at the time of image capture, instead of storing one of them, it is possible to review the effect of the distortion correction in a later time, and select the appropriate correction.

To be sure, even when the wide-angle distortion correction or the optical distortion correction is selected depending on the result of the face detection, as in the third embodiment, the wide-angle distortion corrected image and the optical distortion corrected image may be both stored to the memory card 23 according to need.

For example, the digital camera may be set to store both the wide-angle distortion corrected image and the optical distortion corrected image to the memory card 23 when a human face is detected in a captured image, while storing only the optical distortion corrected image when no human face is detected. Further, the digital camera may be set to store both the wide-angle distortion corrected image and the optical distortion corrected image in the memory card 23 when a human face is detected outside a predetermined angle of incidence in a captured image, while storing only the optical distortion corrected image when no human face is detected or a human face is detected inside a predetermined angle of incidence.

As described, even in the case to decide whether to correct the wide-angle distortion depending on the result of the face detection, both the wide-angle distortion corrected image and the optical distortion corrected image are stored to the memory card 23 if the wide-angle distortion conversion is decided necessary. This allows comparing the two corrected image in a later time and selecting the appropriate one. Additionally, if the digital camera is set to store only the optical distortion corrected image when the wide-angle distortion correction is decided unnecessary from the result of the face detection, waste of the memory card 23 can be prevented.

As is clear from the above, the wide-angle distortion corrected image and the optical distortion corrected image are both produced by applying the coordinate transform processing to the raw principal image data. Accordingly, when the coordinate transform processing is applied to the raw principal image data, it makes no difference which of the wide-angle distortion corrected image and the optical distortion corrected image is produced first.

Further, when the both corrected images are to be stored, if a transform function is one that corrects the wide-angle distortion at only the periphery of a picture frame, there is no need to store full image data for both, but to store full image data for one corrected image and the difference data to this full image data for the other corrected image.

For example, an optical distortion corrected image may be stored as full image data to the memory card 23, and only the difference data may be stored for a wide-angle distortion corrected image. To display the wide-angle distortion corrected image on the display panel 24, the difference data is added to the optical distortion corrected image and then displayed as the wide-angle distortion corrected image. If storing only the difference data for one of the wide-angle distortion corrected image and the optical distortion corrected image, it is possible to save the capacity of the memory card 23. The difference data is calculated in the distortion correction section.

Furthermore, when the coordinate transform processing is performed to produce and store both the wide-angle and the optical distortion corrected images, the coordinate transform processing is not necessarily be applied to the raw principal image data.

Figure 19:
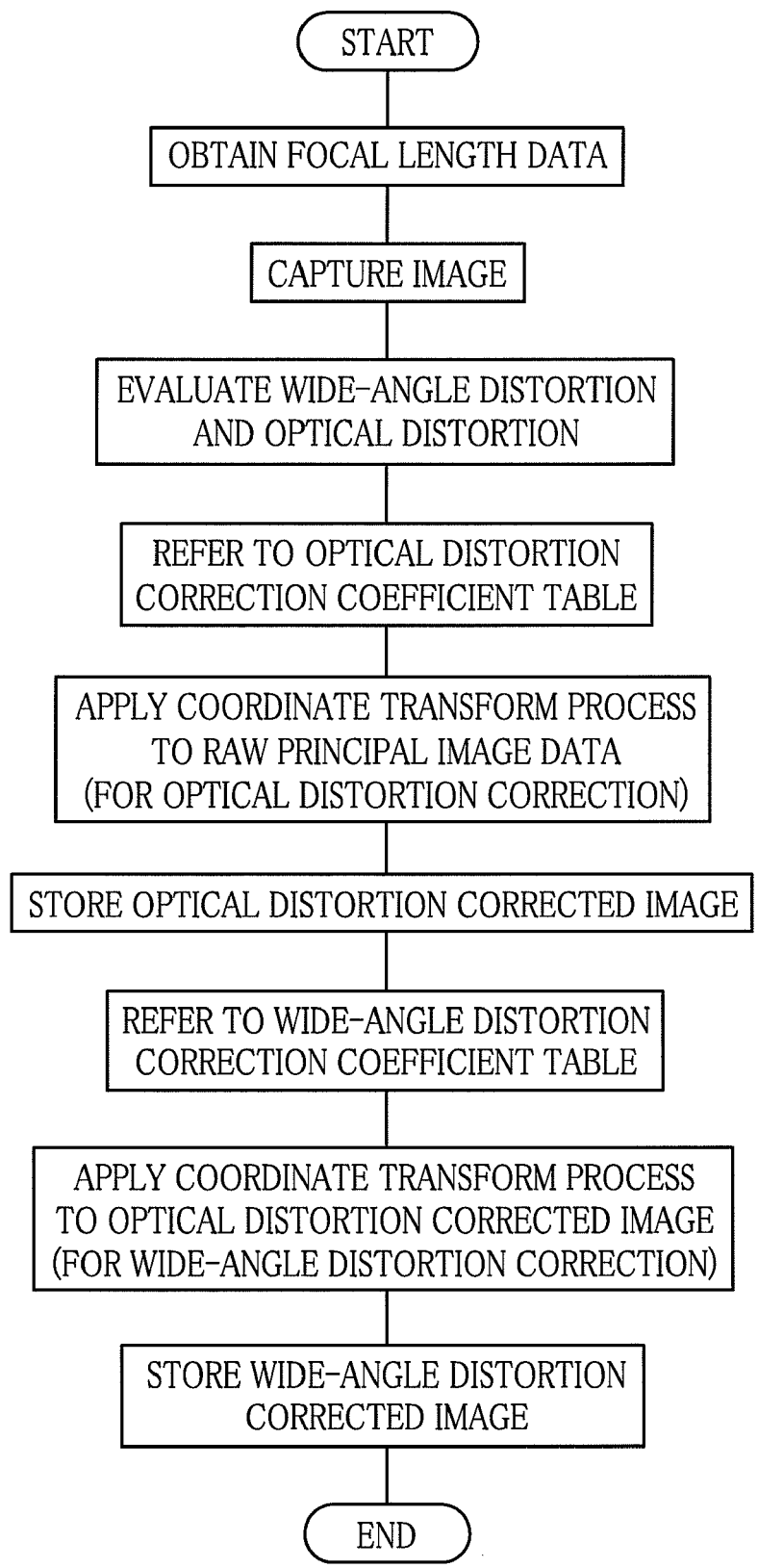
FIG. 19 is a flow chart for producing the wide-angle distortion corrected image by applying the coordination transform processing to the optical distortion corrected image.

For example, as shown in FIG. 19, the coordinate transform processing for optical distortion correction is firstly applied to the raw principal image data, and an optical distortion corrected image is stored to the memory card 23. In this instance, the raw principal image data in the SDRAM 42 is overwritten with the data of the optical distortion corrected image. The coordinate transform processing for wide-angle distortion correction is then applied to the data of the optical distortion corrected image, and a resultant wide-angle distortion corrected image is stored to the memory card 23.

Also, if the wide-angle distortion corrected image is to be stored first to the memory card 23, the coordinate transform processing for optical distortion correction is applied to the data of the wide-angle distortion corrected image in the SDRAM 42, and a resultant optical distortion corrected image is stored to the memory card 23.

By applying the coordinate transform processing for optical distortion correction to the wide-angle distortion corrected image data to obtain an optical distortion corrected image or vise versa, it is possible to save the capacity of the SDRAM 42 during the coordinate transform processing.

When applying the coordinate transform processing for wide-angle distortion correction to the optical distortion corrected image data, the distortion correction section refers to the distortion data and compares the magnitude of the optical distortion and the wide-angle distortion on the raw principal image data. The distortion correction section selects or estimates a necessary coefficient from the wide-angle correction table 61, and performs the coordinate transform processing using the selected coefficient. The same is true when the coordinate transform processing for optical distortion correction is applied to the wide-angle distortion corrected image data.

Further, when the one of the optical distortion and the wide-angle distortion is corrected in the image data having been corrected for the other distortion, the coordinate transform processing is not necessarily performed at the time of image capture. For example, the coefficient of the coordinate transform function, selected or estimated by the distortion correction section, may be correlated with the image data and stored to the memory card 23. The coordinate transform processing is then performed at the time the image is displayed on the display panel 24.

As well as the wide-angle distortion corrected image and the optical distortion corrected image, the raw principal image data may also be stored to the memory card 23.

If the wide-angle distortion corrected image, the optical distortion corrected image and the original image of the same subject are stored to the memory card 23, it is preferred to clarify the differences between these images on the display panel 24. The conventional digital cameras, for example, usually use the reduced images, so-called thumbnail images, so that plural images can be displayed at once. However, the wide-angle distortion corrected image and the optical distortion corrected image cannot show the magnitude of distortion and the effect of correction completely when reduced on the display.

Figure 20:
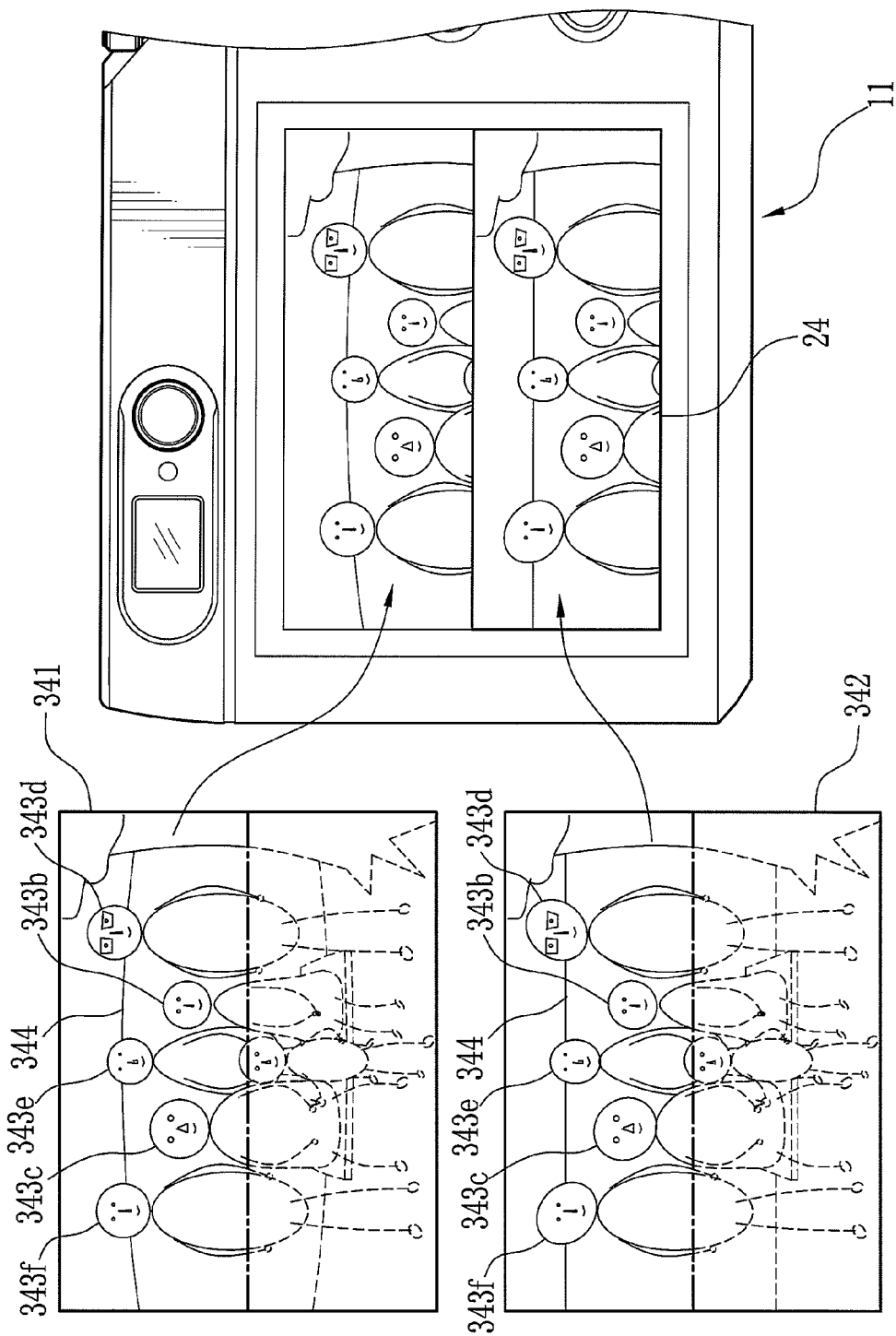
FIG. 20 is an explanatory view of a display to clarify the difference between the wide-angle distortion corrected image and the optical distortion corrected image.

As for the digital camera to store both the wide-angle distortion and the optical distortion corrected images in the memory card, the display panel 24 may be halved up and down, as shown in FIG. 20, and the upper halves of a wide-angle distortion corrected image 341 and an optical distortion corrected image 342 are displayed on top of the other.

In the wide-angle distortion corrected image 341, human faces 343b to 343f are nearly identical to their actual shapes, but the optical distortion is quite noticeable on a background 344. In the optical distortion corrected image 342, on the other hand, the wide-angle distortion is quite noticeable on the human faces 343b to 343f, but the optical distortion is properly corrected on the background 344 where the straight line looks straight.

The wide-angle distortion tends to be prominent at the image periphery and so does the optical distortion. Accordingly, when the wide-angle distortion corrected image 341 and the optical distortion corrected image 342 are compared, the difference between them becomes apparent by displaying the peripheries such as, for example, the upper (lower) halves of these images on the display panel 24.

Instead, the right (or left) halves of the wide-angle distortion corrected image and the optical distortion corrected image may be displayed together. Furthermore, instead of displaying the halves of the images as they are, the images may be enlarged at the image periphery where the wide-angle distortion and the optical distortion tend to be prominent, and displayed together up and down (or right and left). This clarifies the magnitude of distortion and the result of the correction more effectively on the display.

When the wide-angle distortion corrected image and the optical distortion corrected image are displayed together, it is more preferred to display the images not only on the display panel 24, but also on a television screen or a computer monitor connected to the digital camera.

It is also preferred to allow the user to select and delete, while observing, one of the wide-angle distortion corrected image and the optical distortion corrected image from the memory card 23. This can prevent erroneous deletion of necessary images and such operation errors more effectively than the case where the image is deleted by specifying a file name or a thumbnail image. This feature can further eliminate the process to display again the image for selection and deletion, resulting in improvement of user convenience.

While the first to third embodiments correct the wide-angle distortion and/or the optical distortion at the time of image capture, it is possible to store the focal distance data and other necessary data as well as the image data, and to correct the distortion in a later time, for example, when the image is retrieved from the memory card 23.

In the first to third embodiments, the wide-angle distortion or the optical distortion is corrected depending on the image capture mode selected. It is, however, possible to allow deciding on the necessity of the wide-angle distortion correction and the optical distortion correction every time an image is captured.

While the focal length data is obtained at the time of image capture (halfway pressing of the shutter release button) in the first to third embodiments, the focal length data may be obtained in other timing such as, for example, after the image capture (after the image data is obtained).

While the digital cameras of the first to third embodiments have a CCD image sensor, a CMOS or another type of image sensor with a known structure may be used.

While the first to third embodiments are explained with the digital camera, the present invention is applicable to the mobile camera phones, the PDAs, the digital video cameras, the television cameras and other common imaging apparatus.

The EEPROM 58 contains the coefficient data for each type of the lens unit. The lens unit has a signal element to indicate the unit type, which is detected when the lens unit is attached to the camera body. The coefficient data for the detected lens unit is then selected.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An imaging apparatus having a taking lens and an image sensor for photo-electrically converting a subject image formed through said taking lens into an electric image signal, comprising:
   a distortion corrector for correcting optical distortion and wide-angle distortion, when correcting said optical distortion due to distortion aberration of said taking lens, said distortion corrector performing image conversion processing to give said image with distortion of opposite sign to said optical distortion, and when correcting said wide-angle distortion said distortion corrector performing image conversion processing to give said image with negative distortion corresponding to magnitude of said wide-angle distortion.

2. The imaging apparatus of claim 1 further comprising: a correction selector for selecting which to correct said optical distortion and said wide-angle distortion.

3. The imaging apparatus of claim 2, further comprising:
   a face detector for detecting human faces in said image,
   wherein said correction selector selects correcting said wide-angle distortion when a human face is detected in said image.

4. The imaging apparatus of claim 3, wherein said correction selector selects correcting said wide-angle distortion when a human face is detected outside a predetermined angle of incidence.

5. The imaging apparatus of claim 2, wherein when said correction selector selects correcting both said wide-angle distortion and said optical distortion, said distortion corrector produces both an optical distortion corrected image which is corrected for said optical distortion, and a wide-angle distortion corrected image which is corrected for said wide-angle distortion.

6. The imaging apparatus of claim 5, wherein said wide-angle distortion corrected image is produced by applying said image conversion processing to give negative distortion to said optical distortion corrected image.

7. The imaging apparatus of claim 5, further comprising:
   a memory device for storing said optical distortion corrected image and said wide-angle distortion corrected image.

8. The imaging apparatus of claim 7, further comprising:
   a display device for retrieving said optical distortion corrected image and said wide-angle distortion corrected image from said memory device, and halving each of said corrected images, and then juxtaposing corresponding halves of said images; and
   an image selector for selecting one of said optical distortion corrected image and said wide-angle distortion corrected image and for deleting unselected one of said corrected images form said memory device.

9. The imaging apparatus of claim 1, wherein said image conversion processing is coordinate transform processing using a coordinate transform function.

10. The imaging apparatus of claim 9, further comprising: a correction coefficient table containing coefficients of 5 said coordinate transform function.

11. The imaging apparatus of claim 1, wherein the wide angle distortion correction comprises correction of distortion arising from geometric positioning of a subject and the imaging apparatus.

12. The imaging apparatus of claim 11, wherein the wide angle distortion correction is provided as independent from the optical distortion correction due to the lens.

13. An imaging apparatus having a taking lens and an image sensor for photo-electrically converting a subject image formed through said taking lens into an electric image signal, comprising:
   a distortion corrector for correcting optical distortion and wide-angle distortion, when correcting said optical distortion due to distortion aberration of said taking lens, said distortion corrector performing image conversion processing to give said image with distortion of opposite sign to said optical distortion, and when correcting said wide-angle distortion said distortion corrector performing image conversion processing to give said image with negative distortion corresponding to magnitude of said wide-angle distortion,
   further comprising: a correction selector for selecting which to correct said optical distortion and said wide-angle distortion,
   wherein when distortion in said image is negative and has magnitude to correct said wide-angle distortion, said correction selector does not select said optical distortion and said wide-angle distortion but corrects said wide angle distortion using optical distortion due to said distortion aberration.

* * * * *